(12) United States Patent
Scott et al.

(10) Patent No.: US 7,266,777 B2
(45) Date of Patent: Sep. 4, 2007

(54) CONFIGURABLE CONTROLLING DEVICE HAVING AN ASSOCIATED EDITING PROGRAM

(75) Inventors: Wayne Scott, Newport Beach, CA (US); Christopher Alan Chambers, Stanton, CA (US); Cheryl Scott, Newport Beach, CA (US); Han-Sheng Yuh, Diamond Bar, CA (US); Ramzi Ammari, Newport Coast, CA (US)

(73) Assignee: Universal Electronics Inc., Cypress, CA (US)

( * ) Notice: Subject to any disclaimer, the term of this patent is extended or adjusted under 35 U.S.C. 154(b) by 34 days.

(21) Appl. No.: 11/218,900

(22) Filed: Sep. 2, 2005

(65) Prior Publication Data

US 2006/0050142 A1    Mar. 9, 2006

Related U.S. Application Data

(60) Provisional application No. 60/705,926, filed on Aug. 5, 2005, provisional application No. 60/608,183, filed on Sep. 8, 2004.

(51) Int. Cl.
G06F 3/048    (2006.01)

(52) U.S. Cl. ............. 715/762; 715/765; 715/847; 715/771; 715/763; 715/967; 715/501.1; 348/734

(58) Field of Classification Search ............... 715/762, 715/765, 866, 847, 771, 773, 763, 967, 970, 715/853, 501.1; 345/172, 168; 348/734
See application file for complete search history.

(56) References Cited

U.S. PATENT DOCUMENTS 5,555,369 A * 9/1996 Menendez et al. ......... 715/762

| | | | |
|---|---|---|---|
| 5,909,545 A | 6/1999 | Frese, II et al. | 398/200.38 |
| 5,940,074 A | 8/1999 | Britt, Jr. et al. | 345/333 |
| 6,211,870 B1 | 4/2001 | Foster | 345/333 |
| 6,237,006 B1 * | 5/2001 | Weinberg et al. | 715/853 X |
| 6,437,836 B1 | 8/2002 | Huang et al. | 348/734 |
| 6,587,067 B2 | 7/2003 | Darbee et al. | 341/176 |
| RE38,598 E | 9/2004 | Frese, II et al. | 709/208 |
| 6,898,424 B2 | 5/2005 | Nishida | 455/420 |
| 6,909,378 B1 | 6/2005 | Lambrechts et al. | 340/825.22 |
| 7,159,185 B1 * | 1/2007 | Vedula et al. | 715/763 |
| 2001/0011953 A1 | 8/2001 | Shintani et al. | 340/825.22 |
| 2002/0154888 A1 * | 10/2002 | Allen et al. | 348/734 X |
| 2002/0199025 A1 * | 12/2002 | Kutay et al. | 715/763 X |
| 2005/0071749 A1 * | 3/2005 | Goerke et al. | 715/501.1 |
| 2005/0256590 A1 | 11/2005 | Choi | 700/20 |

FOREIGN PATENT DOCUMENTS

WO    WO 0039772    7/2000

* cited by examiner

*Primary Examiner*—Raymond J. Bayerl
(74) *Attorney, Agent, or Firm*—Gary R. Jarosik

(57) ABSTRACT

A configurable controlling device and associated editor program that allows a consumer to create on a personal computer for downloading to the controlling device a user interface comprised of user interface pages having icons which icons, when activated on the controlling device, cause the controlling device to perform a function, such as to transmit a command to an appliance, to change the user interface page being displayed, etc. The editor program allows for the visualization of links created between user interface pages, single step assigning of commands to logical groups of function keys (both iconic and hard keys), single step assigning of backgrounds to groups of user interface pages, and pre-rendering of user interface pages prior to the downloading of the user interface to the controlling device.

9 Claims, 26 Drawing Sheets

| Description | Data Format | Name | Example | Count |
|---|---|---|---|---|
| Project XML File | XML | *ProjectName*.nevoproj | MyHouse.nevoproj | 1 |
| Sitemap XML File | XML | Sitemap.xml | | 1 |
| Page XML File | XML | p_*PageId*.xml | p_0001.xml | 1 per Page |
| Page Collection XML File | XML | pg_*PageCollectionId*.xml | pg_0001.xml | 1 per Page Collection |
| Device XML File | XML | dv_*DeviceId*.xml | dv_0001.xml | 1 per Device |
| NevoLink XML File | XML | bl_*NevoLinkId*.xml | bl_0001.xml | 1 per NevoLink |
| Media Zone XML File | XML | mz_*MediaZoneId*.xml | mz_0001.xml | 1 per MediaZone |
| Resources File | Binary | AllResources.resources | | 1 |

```
<ProjectSettings>
    <ResourceManagerInputDirectory>C:\Program Files\Nevo\NevoStudio\Gallery\Buttons\Activities</ResourceManagerInputDirectory>
    <HomePageId>4</HomePageId>
    <NevoSlDeviceSettings>
        <AcPowerScheme>
            <BacklightIdle>300</BacklightIdle>
            <Brightness>80</Brightness>
            <Suspend>600</Suspend>
            <SystemIdle>300</SystemIdle>
            <UserIdle>150</UserIdle>
            <WifiTimeout>600</WifiTimeout>
        </AcPowerScheme>
        <BatteryPowerScheme>
            <BacklightIdle>300</BacklightIdle>
            <Brightness>80</Brightness>
            <Suspend>600</Suspend>
            <SystemIdle>300</SystemIdle>
            <UserIdle>150</UserIdle>
            <WifiTimeout>600</WifiTimeout>
        </BatteryPowerScheme>
        <Password>R7MEUjX2v5g/mxdm</Password>
        <TimeDisplayFormat>0</TimeDisplayFormat>
        <EnableWIFI>True</EnableWIFI>
        <EnableMainMenu>True</EnableMainMenu>
        <EnableMediaZones>False</EnableMediaZones>
        <EnableSettingsLock>False</EnableSettingsLock>
        <EnableSettings>True</EnableSettings>
    </NevoSlDeviceSettings>
</ProjectSettings>
```

```xml
<?xml version="1.0" encoding="utf-16" ?>
<SiteMap Version="1.0" Scale="0.5">
    <Node WidgetType="2" Widget="2" Location="450,200" Index="-1" Label="Home" Visible="False" />
    <Node WidgetType="1" Widget="4" Location="450,200" Index="-1" Label="Home Page" Collapsed="True" />
    <Node WidgetType="1" Widget="8" Location="620,200" Index="-1" Label="New Page 2" Collapsed="True" />
    <Node WidgetType="2" Widget="11" Location="450,699" Index="-1" Label="Sony TV" Collapsed="True" />
    <Node WidgetType="1" Widget="30" Index="-1" Label="HDTV STB Digits" Visible="False" Collapsed="True" />
    <Node WidgetType="1" Widget="44" Index="-1" Label="HDTV STB Setup" Visible="False" Collapsed="True" />
    <Node WidgetType="1" Widget="61" Index="-1" Label="HDTV STB Control" Visible="False" Collapsed="True" />
    <Node WidgetType="1" Widget="96" Index="-1" Label="Fastext" Visible="False" Collapsed="True" />
    <Node WidgetType="1" Widget="112" Index="-1" Label="HDTV STB Power" Visible="False" Collapsed="True" />
    <Link From="4" To="8" LinkType="1" />
    <Link From="30" To="44" LinkType="1" Visible="False" />
    <Link From="44" To="61" LinkType="1" Visible="False" />
    <Link From="61" To="96" LinkType="1" Visible="False" />
    <Link From="96" To="112" LinkType="1" Visible="False" />
</SiteMap>
```

```
<W STId="1" Id="30" Cn="HDTV STB Digits" Area="(0,25,240,295)" ShCap="T" FIUDF="F"
FIC="-16777216" FIA="MC" FIN="Tahoma" FISz="8.25" FISy="0" FIFF="Tahoma" FIU="Point"
SortOrder="10" InheritsBackground="F" InheritsFont="F" InheritsFunctionKeys="T"
InheritsHardKeys="T" MasterPageId="1" PageGroupId="11" PageKeyGuideId="31"
BackgroundInfoBackgroundType="ImageResource"
BackgroundInfoColor="-1775639" BackgroundInfoImageResourceId="111">
```
— 2602

— 2604

. . . . .  ← 2606

```
<W STId="4" Id="37" Cn="5" Area="(88,83,64,31)" ShCap="T" FIUDF="F" FIC="-16777216"
FIA="MC" FIN="Tahoma" FISz="8.25" FISy="0" FIFF="Tahoma" FIU="Point" BT="Button1Center"
BTSz="M" SymCode="5" SIA="MC" ShSI="F" SymSize="M" SymBr="Light" NIId="116" PIId="117">
    <MDA>
        <A AI="IR.Send 117,5" AT="1" AS="117" AD="5" />
    </MDA>
    <MUA>
        <A AI="IR.Stop 117" AT="6" AS="117" AD="0" />
    </MUA>
</W>
```

2612 { <MDA>...</MDA>
2614 { <MUA>...</MUA>

2610 — entire <W>...</W>

CONFIGURABLE CONTROLLING DEVICE HAVING AN ASSOCIATED EDITING PROGRAM

RELATED APPLICATION INFORMATION

This application claims the benefit of U.S. Provisional Patent Application Nos. 60/608,183 filed on Sep. 8, 2004 and 60/705,926 filed on Aug. 5, 2005, both of which are incorporated herein by reference in their entirety.

BACKGROUND

The following relates generally to controlling devices and, more particularly, to a configurable controlling device having an associated editor program for use in configuring, among other things, the user interface of the controlling device.

Editor programs for configuring a controlling device, such as a hand held remote control, are known in the art. For example, U.S. Pat. No. 6,211,870 illustrates and describes a controlling device which is programmable from a PC using an advanced, object-oriented user interface. More particularly, multiple user selectable screen objects may be created on the PC and transferred to the controlling device. The screen objects include screen layout and descriptions of soft keys to be displayed on a graphic display of the controlling device, as well as commands associated with the screen object, the soft keys and/or the programmable keys on the remote control unit. The user may then select any of the screen objects once they have been transferred to the controlling device to control the operation of various appliances.

Similarly, PCT published application no. WO 00/39772 discloses a universal, programmable remote control device which has programming that enables an end-user to customize the remote control device through editing or programming of the control functionalities of the remote control device. The programming is achieved via a PC. In this manner, the control configuration created via an editor on the PC can be downloaded into the device. It is additionally disclosed that the PC has emulator software to test the configuration before downloading. It is to be understood that WO 00/39772 generally discloses the editor for the Philips' "Pronto" remote control.

While these known controlling devices and associated editor programs do work for their intended purpose, a need remains for an improved controlling device having an improved, associated editor program for use in configuring the controlling device.

SUMMARY

In accordance with this and other needs, the following generally discloses an editor program for use in configuring a user interface of a controlling device, such as a hand-held remote control unit. The editor program allows a consumer to create on a personal computer for downloading to a controlling device a graphical user interface comprised of user interface pages having icons which icons, when activated on the controlling device, cause the controlling device to perform a function, such as to transmit a command to an appliance, to change the user interface page being displayed, etc. The editor program advantageously provides, among other things, for the visualization of links created between user interface pages, single step assigning of commands to logical groups of function keys (both iconic and hard keys), single step assigning of backgrounds to groups of user interface pages, and pre-rendering of user interface pages prior to downloading of the user interface to the controlling device.

The various advantages, features, properties and relationships of this improved user interface editor will be obtained from the following detailed description and accompanying drawings which set forth illustrative embodiments which are indicative of the various ways in which the principles thereof may be employed.

BRIEF DESCRIPTION OF THE DRAWINGS

For use in better understanding the exemplary controlling devices and editor program described hereinafter reference may be had to the following drawings in which:

FIGS. 23 through 26 illustrate an exemplary container file and associated sets of data structures suitable for storing an editable GUI as a local file on a PC.

DETAILED DESCRIPTION

Figure 1:
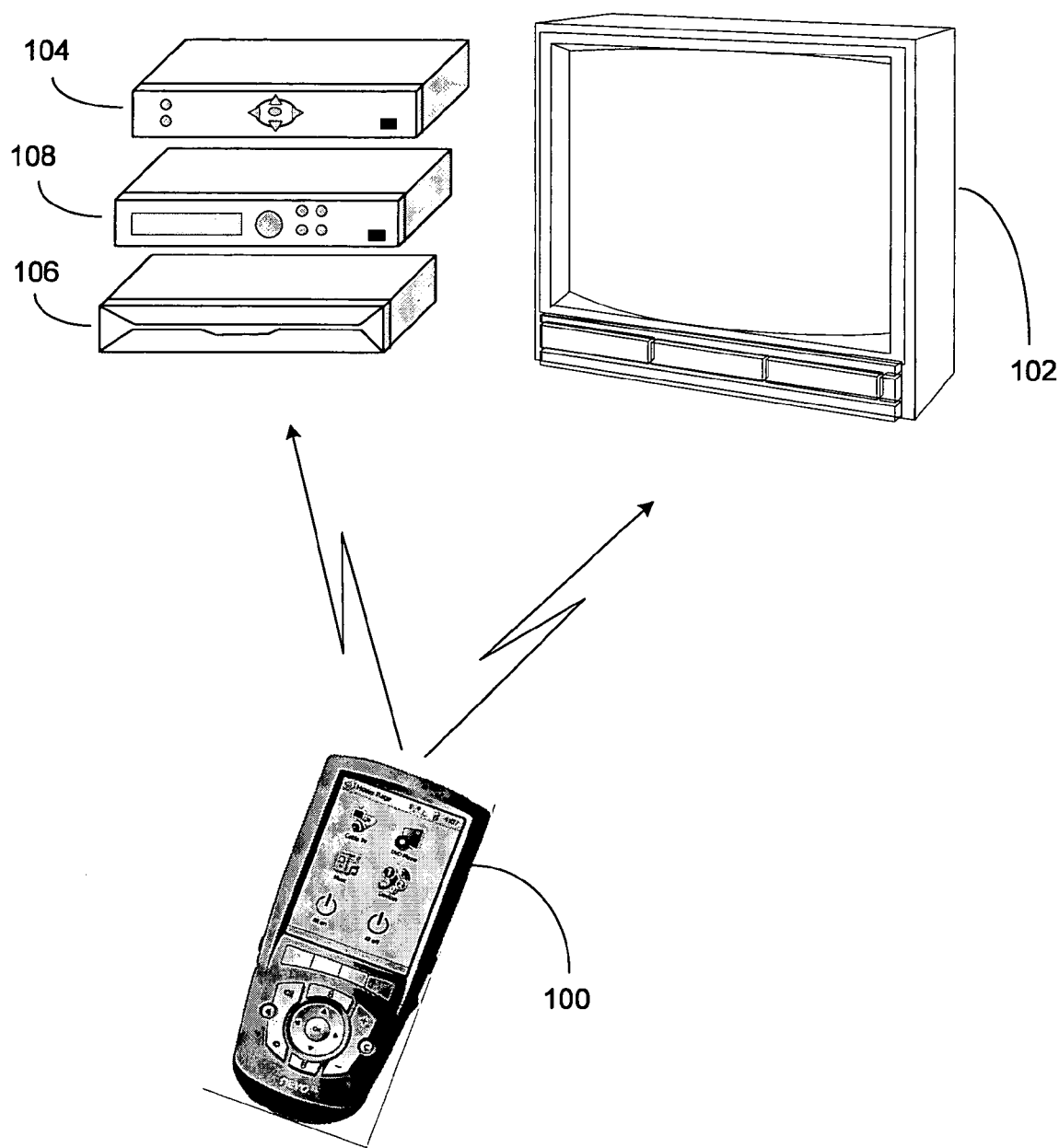
FIG. 1 illustrates an exemplary home entertainment system in which the exemplary controlling devices may be utilized.

The following discloses a controlling device having a face panel on which is carried a user interface activatable to cause transmission of at least one command to at least one appliance. Turning now to the figures, wherein like reference numerals refer to like elements, FIG. 1 illustrates an exemplary system including controllable appliances, such as a set top box ("STB") 104, a DVD player 106, an audio amplifier/receiver 108 and a television 102, as well as a controlling device 100. The controlling device 100 is capable of transmitting commands to the appliances, using any convenient IR, RF, Point-to-Point, or networked protocol, to cause the appliances to perform operational functions. While illustrated in the context of a STB 104 with DVD player 106, audio system 108 and television 102, it is to be understood that controllable appliances can include, but are not limited to, televisions, VCRs, DVRs, DVD players, cable or satellite converter set-top boxes (STBs), amplifiers, CD players, game consoles, home lighting, drapery controls, fans, HVAC systems, thermostats, personal computers, etc., and, as such, the instant exemplary disclosures are not intended to be limiting as to type or quantity of controllable appliances or equipment.

Figure 2:
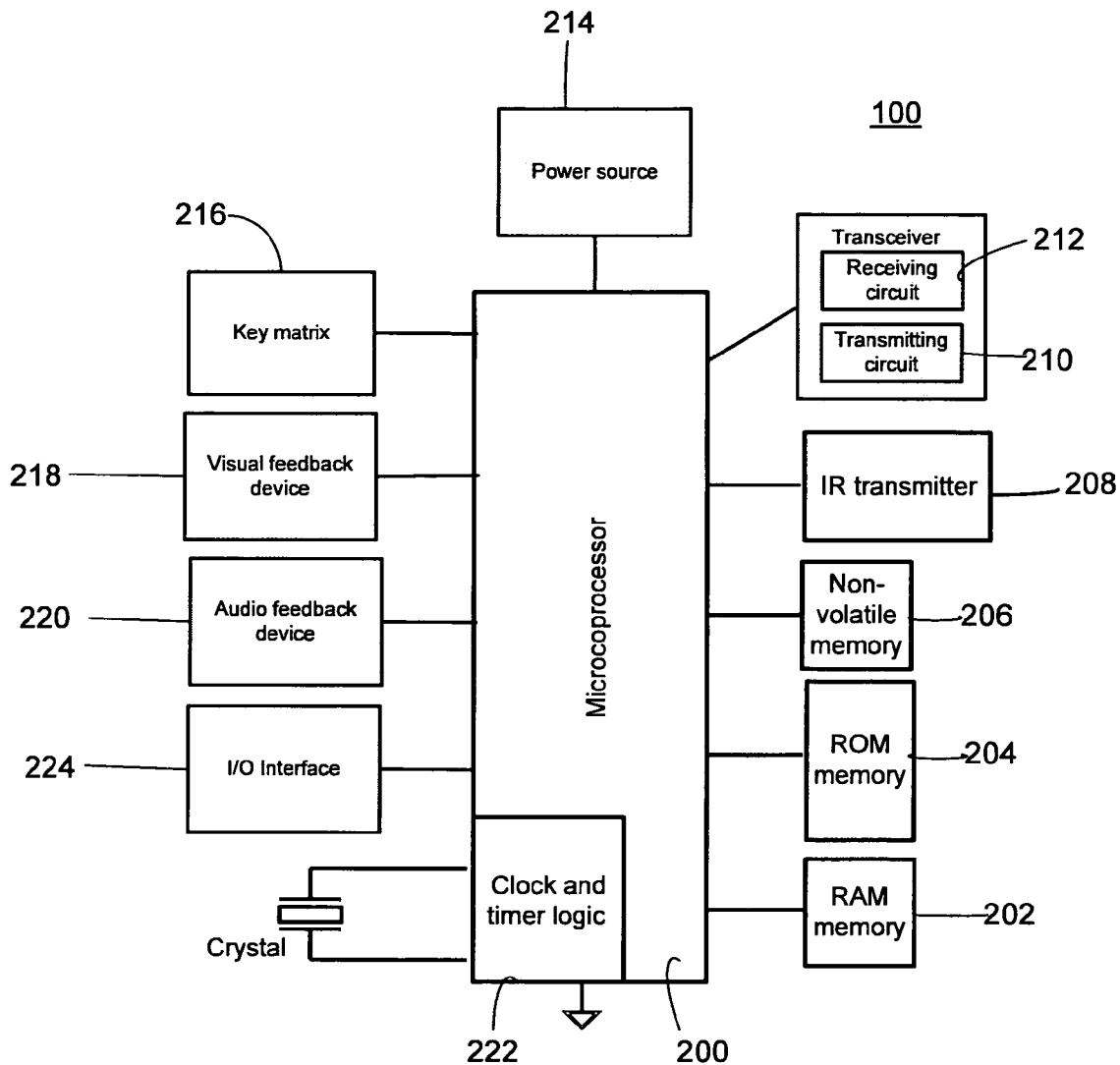
FIG. 2 illustrates a block diagram of components of an exemplary controlling device.

Turning now to FIG. 2, for use in transmitting command codes to one or more of the appliances, the controlling device 100 of the exemplary system may include, as needed for a particular application, a processor 200 coupled to a memory device (such as ROM memory 204, RAM memory 202, and/or a non-volatile memory 206), a key matrix 216 (e.g., physical buttons, a touch sensitive display with soft keys, or a combination thereof), an internal clock and timer 222, an IR (or RF) transmitter 208 for issuing commands to controlled appliances, RF (or IR) wireless transmission and reception circuit(s) 210, 212 and/or a physical input/output interface 224 for use in transferring data between the controlling device and external computing devices such as a PC, a network interface, etc., a means 218 to provide visual feedback to the user (e.g., LCD display or the like, which may underlay all or part of a touch sensitive portion of key matrix 216), a means 220 to provide audio feedback (speaker, buzzer, etc.) and a power supply 214 all as generally illustrated in FIG. 2. As will be understood by those of skill in the art, the memory device(s) may include executable instructions that are intended to be executed by the processor 200 to control the operation of the controlling device 100.

The non-volatile read/write memory 206, for example an EEPROM, battery-backed up RAM, Smart Card, memory stick, or the like, may be provided to store setup data and parameters as necessary. It is to be additionally understood that the memory devices may take the form of any type of readable media, such as, for example, ROM, RAM, SRAM, FLASH, EEPROM, Smart Card, memory stick, a chip, a hard disk, a magnetic disk, and/or an optical disk. Still further, it will be appreciated that some or all of the illustrated memory devices 202, 204, and 206 may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 216, receipt of a data or signal transmission, etc. In response to an event, appropriate instructions within the memory may be executed. For example, when a command key is activated on the controlling device 100, the controlling device 100 may retrieve a command code corresponding to the activated command key from memory 204 or 206 and transmit the command code to a device in a format recognizable by the device. It will be appreciated that the instructions within the memory can be used not only to cause the transmission of command codes and/or data to the appliances but also to perform local operations. While not limiting, other local operations that may be performed by the controlling device 100 include execution of pre-programmed macro command sequences, displaying information/data, manipulating the appearance of a graphical user interface presented on a local LCD display 218, etc. In this context, co-pending U.S. patent application Ser. No. 10/288,727 entitled "User Interface for a Hand Held Remote Control Device," which is hereby incorporated by reference in its entirety, provides further detail which will not be repeated herein for the sake of brevity.

For convenience and economy of development effort, the software programming of controlling device 100 may utilize an underlying operating system such as, for example, Microsoft's Windows CE product.

Figure 3A:
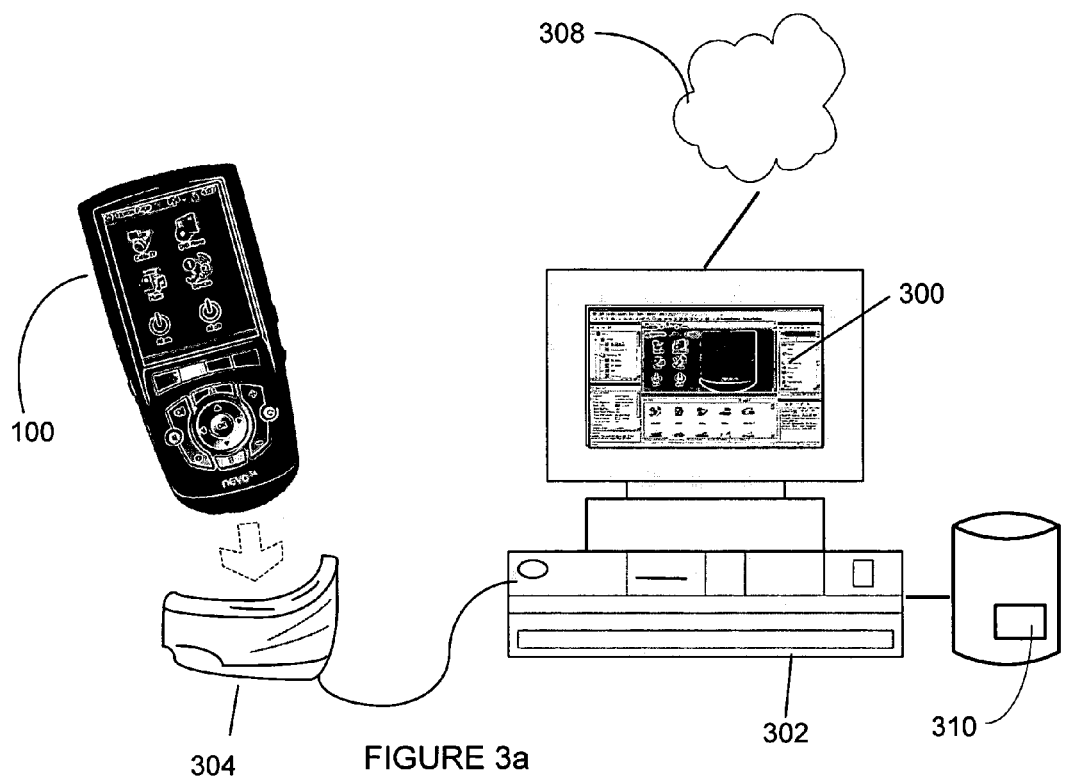
FIGS. 3a and 3b illustrate exemplary editing systems which may be used to configure and download the configuration, including a user interface, to an exemplary controlling device.
Figure 3B:
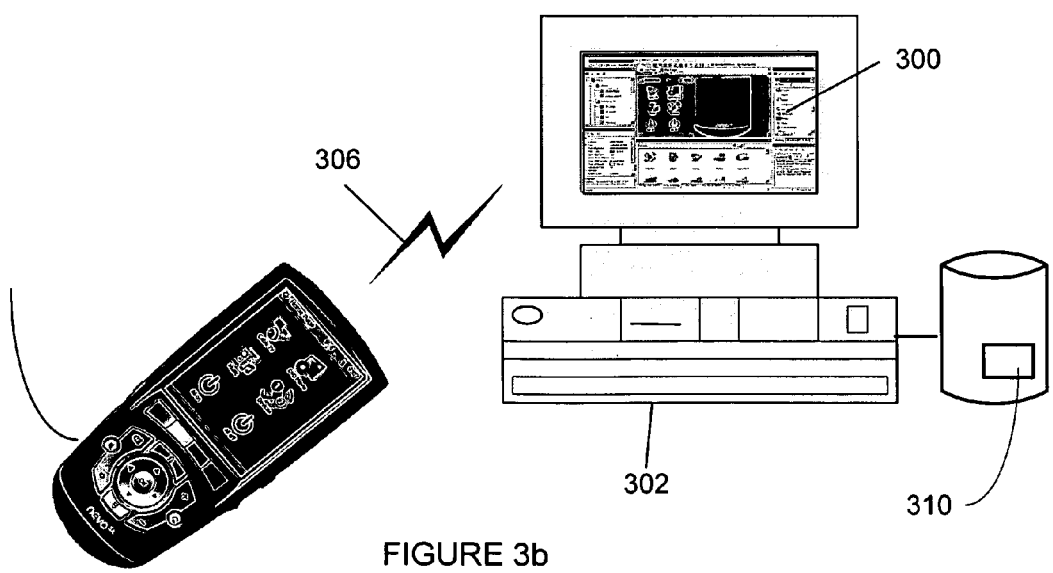
Figure 4:
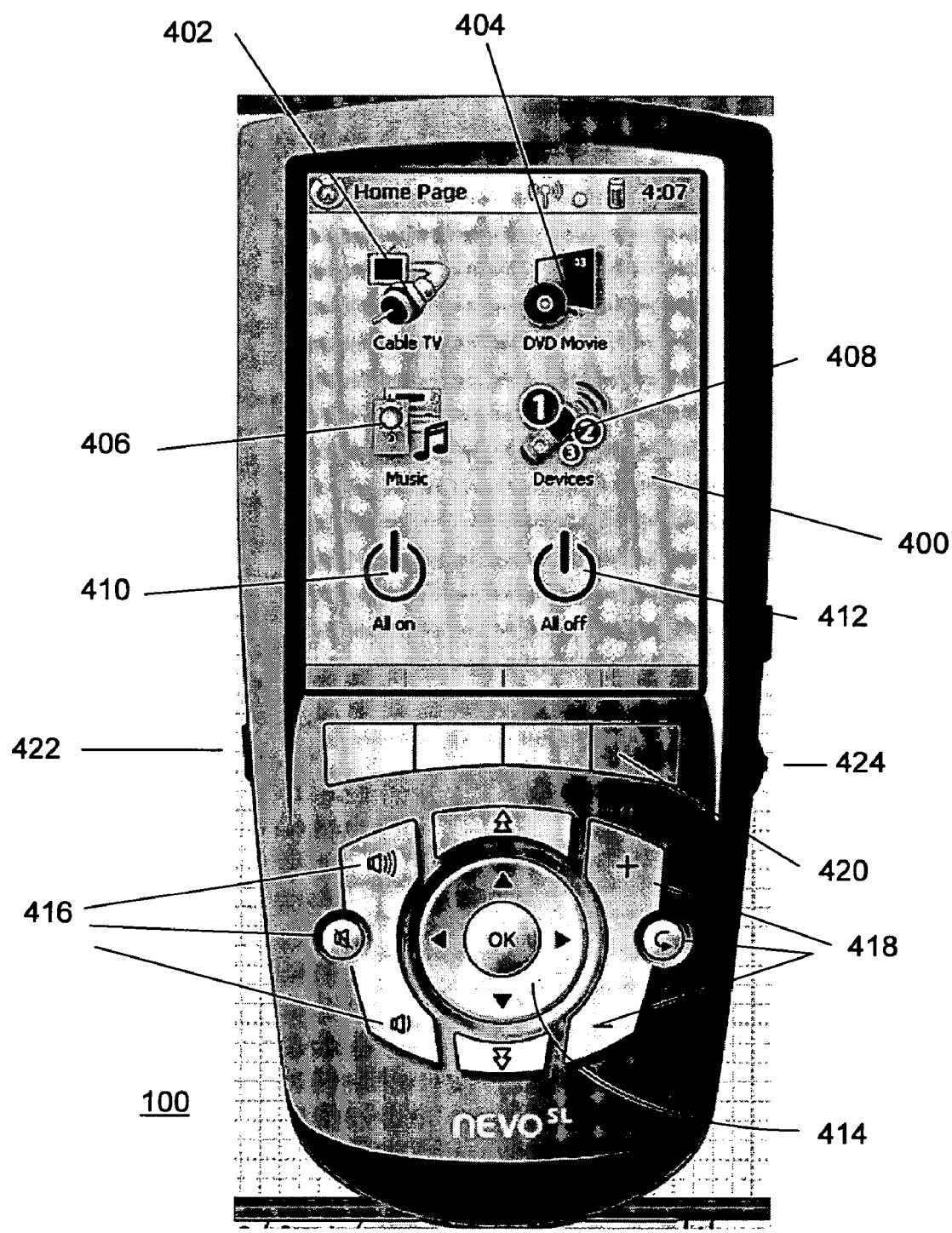
FIG. 4 illustrates an exemplary home page graphical user interface ("GUI") for the touch screen of a controlling device.

As contemplated in the above referenced and related provisional application 60/608,183 and 60/705,926, the graphical user interface ("GUI") and certain functionalities of controlling device 100 may be defined via a software based editing tool 300 which may be supplied as an application program to be installed on a PC 302 running an operating system, for example, Microsoft's Windows XP operating system, as generally illustrated in FIGS. 3a and 3b and described in further detail hereinafter. In the illustrative examples that follow, it will be appreciated by those skilled in the art that development tools such as Microsoft's Visual Studio, the C# programming language, and third party libraries such as for example, those available from Syncfusion Inc. (Morrisville, N.C.) and Northwoods Software (Nashua, N.H.) may be used to facilitate creation of the software comprising exemplary editing tool 300 and exemplary controlling device 100 GUI and functionality. In particular, Microsoft's basic building blocks may be used to support networking, messaging (including operating system related messaging), graphic elements, printing, file access, Web services, etc., while Syncfusion's suite may provide enhanced widgets such as tree control, docking panels, drag and drop handlers, Microsoft Office 2003 look and feel controls, etc., and Northwoods' library may provide diagram control which, for example, allows nodes and connectors to be depicted on a virtual drawing surface.

Editor application 300 may be offered by the manufacturer of the controlling device 100 on a CD ROM, for download from a Web site, etc., as appropriate for installation on a PC of the user's choice. Once the editor application is installed on the user's PC 302, the controlling device GUI may be created or revised using the editor application, stored locally as a file 310 on PC 302 and/or caused to be downloaded into controlling device 100 via a hardwired docking station 304, a wireless link 306 (e.g., IEEE 802.11, Bluetooth, Zigbee, etc.) or any other convenient means. Additionally, it will be appreciated that the editor application 300, although primarily resident on the user's local PC 302, may also be adapted to access additional data items from remotely located servers via the Internet 308, from appliances linked to the PC 302 via a home network, etc.

Examples of such items may include, without limitation, IR command codes (e.g., to allow for support of new appliances), data which indicates operations supported by an appliance, device model number cross-references (e.g., for entering into the controlling device for set-up purposes as disclosed in, for example, U.S. Pat. No. 6,587,067), operational software updates for controlling device 100, etc. It will also be appreciated that in such an environment data may also be uploaded from PC 302 to a centralized repository, e.g., a remotely located, Internet accessible server. Such uploaded information may include, for example, current user configurations, learned IR code data, etc., and may be comprised of or derived from data stored locally on PC 302 (for example, file 310) and/or data retrieved from controlling device 100 during the times controlling device 100 is coupled to PC 302.

Certain aspects of the operation of exemplary controlling device 100 will now be discussed in conjunction with FIGS. 4 through 8. In this context, as will be appreciated by those skilled in the relevant art and/or familiar with the previously referenced, parent, U.S. provisional applications, the actual appearance and functionality of all the GUI pages in controlling device 100 represent only one instance of the output of editor application 300. It will thus be understood that the GUIs and associated functionality presented herein are by way of example only and not intended to be limiting in any way.

Controlling device 100 may include both a touch activated LCD screen 218 with soft keys (or other form of touch panel) and several groups of hard buttons 414, 416, 418. The hard button groups might comprise, for example, a volume control group 416 (e.g., volume up, down, and mute), a channel changing group 418 (e.g., channel up, down, and return), a navigation group embodied in disk 414 (e.g., for menu navigation and selection including up, down, left, right, and enter/select), and/or a row of programmable keys 420 (e.g., keys for supporting macros or other to-be-configured functions). Keys of the remote control having numerical labels (e.g., 0-9) may also be considered to be a logical group of keys that provide for digit entry operations.

Upon start of operation, or any time the "Home" button 422 (e.g., located on the side of the device) is activated, an exemplary Home Page GUI 400 may be presented within the display. The illustrated, exemplary home Page 400 includes six touch-activated keys. By way of example only, touching icon 402 may be used to initiate the activity of watching cable TV by causing controlling device 100 to transmit the commands required to power on cable STB 104, power on TV 102, select the TV input to which the cable STB is connected, and then cause the controlling device GUI to transition to the page (e.g., display having soft keys, an EPG, or the like) from which cable STB channel selection may be input (for further tuning, retrieving related content information, etc.). Touching icon 404 may be used to similarly cause the controlling device to place the entertainment system into a condition suitable for watching a DVD movie, while touching icon 406 may be used to cause the controlling device to place the system into a condition suitable for listening to music. Touching icon 410 and 412 may be used to cause the controlling device to power on or off all (or a subset) of the system devices, respectively. Touching icon 408 may be used to cause the controlling device to transition to another page 500 of the GUI, e.g., the GUI page illustrated in FIG. 5, from where individual device control pages may be called up, i.e., navigated to, using icons 502 (cable STB), 504 (TV), 506 (DVR player) or 508 (audio receiver). Examples of individual device control pages are shown in FIG. 6 (GUI page 600 having soft keys for use in controlling receiver input selection commands), FIG. 7 (GUI page 700 having soft keys for use in controlling DVD transport functions), and FIG. 8 (GUI page 800 having soft keys for controlling DVD slow motion controls). By way of further example of how GUI pages may be programmed to interrelate, activation of the "Slow" icon 702 in the DVD transport control page 700 (FIG. 7) not only will cause the controlling device to transmit a "slow" command to the DVD player but may also automatically cause the controlling device to transition the GUI to the DVD slow motion control page 800 (FIG. 8) in connection with the transmitting of the command. Similarly, touching the "play" icon 802 of the DVD slow motion control page 800 may cause the controlling device to transmit the "resume normal speed playback" command to the DVD player while causing the controlling device to transition the GUI back to DVD transport controls page 700. In this way it will be understood and appreciated that a plurality of commands and/or actions may be performed both locally on controlling device 100 and remotely on the various appliances under the control of controlling device 100 in response to a single or multiple interaction(s) by a user with the key matrix 216 of controlling device 100.

Figure 9:
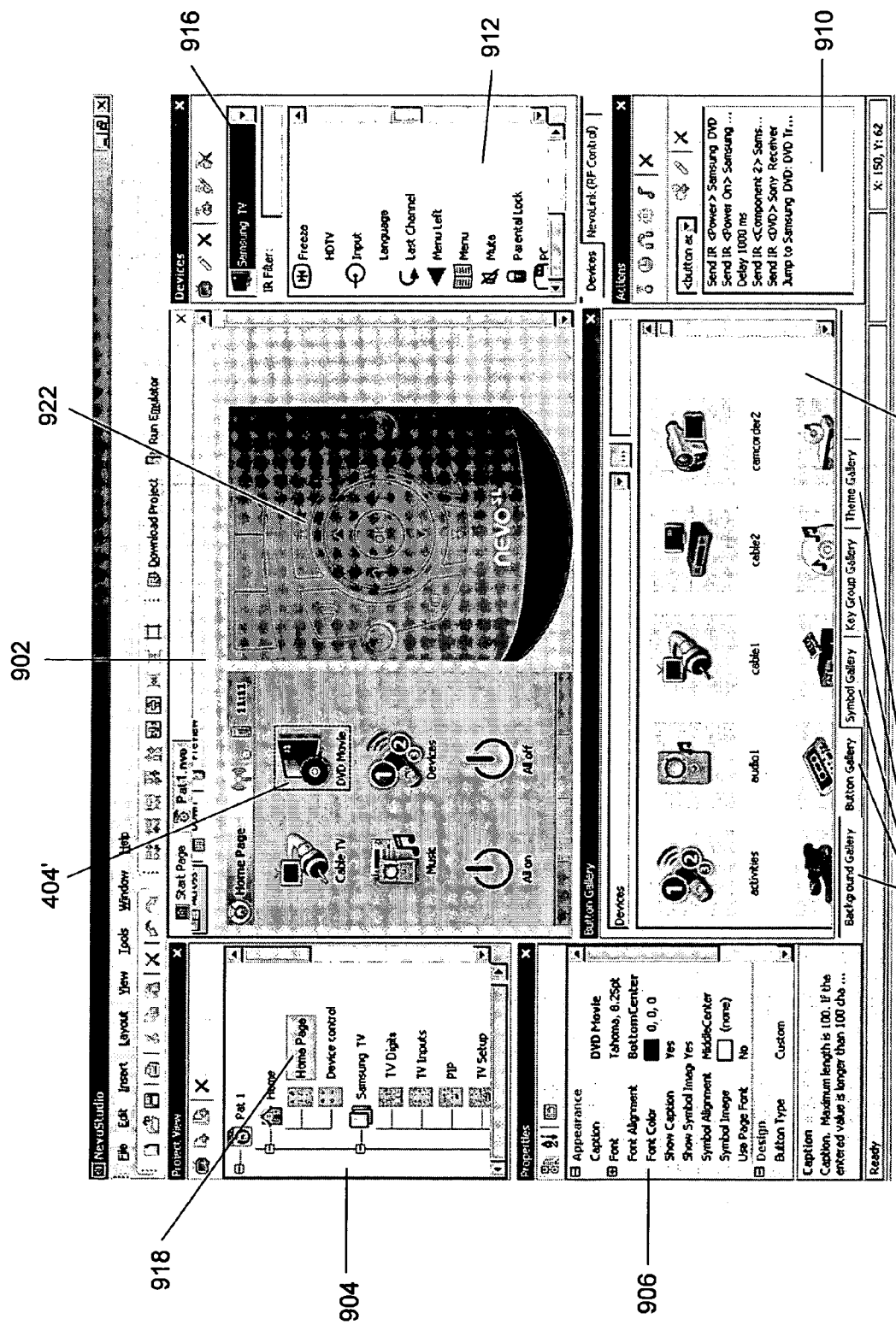
FIG. 9 illustrates an exemplary PC-based editor used to create the appearance and functionality of the GUI of FIG. 4.

Turning now to FIG. 9, the operation of the editing program 300 used to create the above-disclosed, exemplary GUI pages and associated functionality will be described in further detail. For this purpose, the PC screen display of the editor application may be divided into several windows or panels, each having a specific purpose. By way of example, the panels may be as follows:

Main project panel 902, used to display the current GUI page being edited (Home Page 400 in this illustration) together with a representation 922 of the hard keys (keys 414 through 420) available on target controlling device 100;

Project View panel 904, used to display all currently defined GUI pages in a tree structure form (which may, as depicted in the exemplary embodiment show, have collapse [−] and expand [+] functionality including selective expansion of individual nodes and/or a collapse all/expand all feature) where the GUI page to be edited may be selected (e.g., by clicking on a link) from within the tree structure list and wherein the GUI page being displayed in the Main project panel 902 may be indicated by a highlight 918 (the Home Page in the instant illustration);

Properties panel 906, used to display a list of (and allow editing of—for example by text entry, selection from drop down menus, etc.) the properties (such as the caption text and font attributes, symbol position, button type, etc.) associated with a presently selected GUI icon or hard key image within Main project panel 902 (GUI icon or soft key 404' with label "DVD Movie" in this illustration, as indicated by the highlight (dotted line) around icon 404' displayed in Main project panel 902);

Gallery panel 908, used to display graphic images which may be dragged and dropped onto the GUI pages being edited wherein the Gallery choices may include sets of icons for use as buttons, page backgrounds, symbols for labeling buttons, key groups (to allow a group of related key icons, e.g. a numeric pad, to be dragged into place in a single operation), or to allow pre-defined themes to be applied to single pages or groups of pages and wherein the Gallery in use (when multiple, organized Galleries are provided) is selected via tabs 914 according to the exemplary embodiment shown; and Actions panel 910, used to display a list of (and allow editing of—for example by dragging and dropping to change the order, by deleting selected items, etc.) the actions to be performed by controlling device 100 when the currently selected icon (in the Main panel 902) is activated by a user when the user interface is provided to the controlling device (e.g., in the example presented, it can be seen that activating the "DVD Movie" icon 404' will: (1) transmit a "Power On" command to DVD player 106, (2) transmit a "Power On" command to TV set 102, (3) wait one second for the devices to stabilize, then (4) transmit a "Component 2" input selection command to TV 102, (5) transmit "DVD" input selection command to Audio Receiver 108, and finally (6) jump to GUI page 700 corresponding to the DVD transport controls (illustrated in FIGS. 7 and 10).

Devices panel 912 is preferably used to display a listing of all remote control commands available for each of the appliances setup to be controlled by controlling device 100 wherein the list of commandable functions for a given appliance to be displayed may be selected from a drop down list 916 (which in the illustrative example would comprise a TV 102, a cable STB 104, a DVD player 106, and an audio receiver 108) and wherein the commandable functions so displayed may be assigned to any icon displayed in main project panel 902 by simply clicking and dragging a commandable function icon to, for example, a desired location with a listing of functions displayed in the Actions panel 910 and/or over an icon displayed in the Main panel (where it would be added, for example, to the top or bottom of the listing of commands within the Action panel display).

Figure 7:
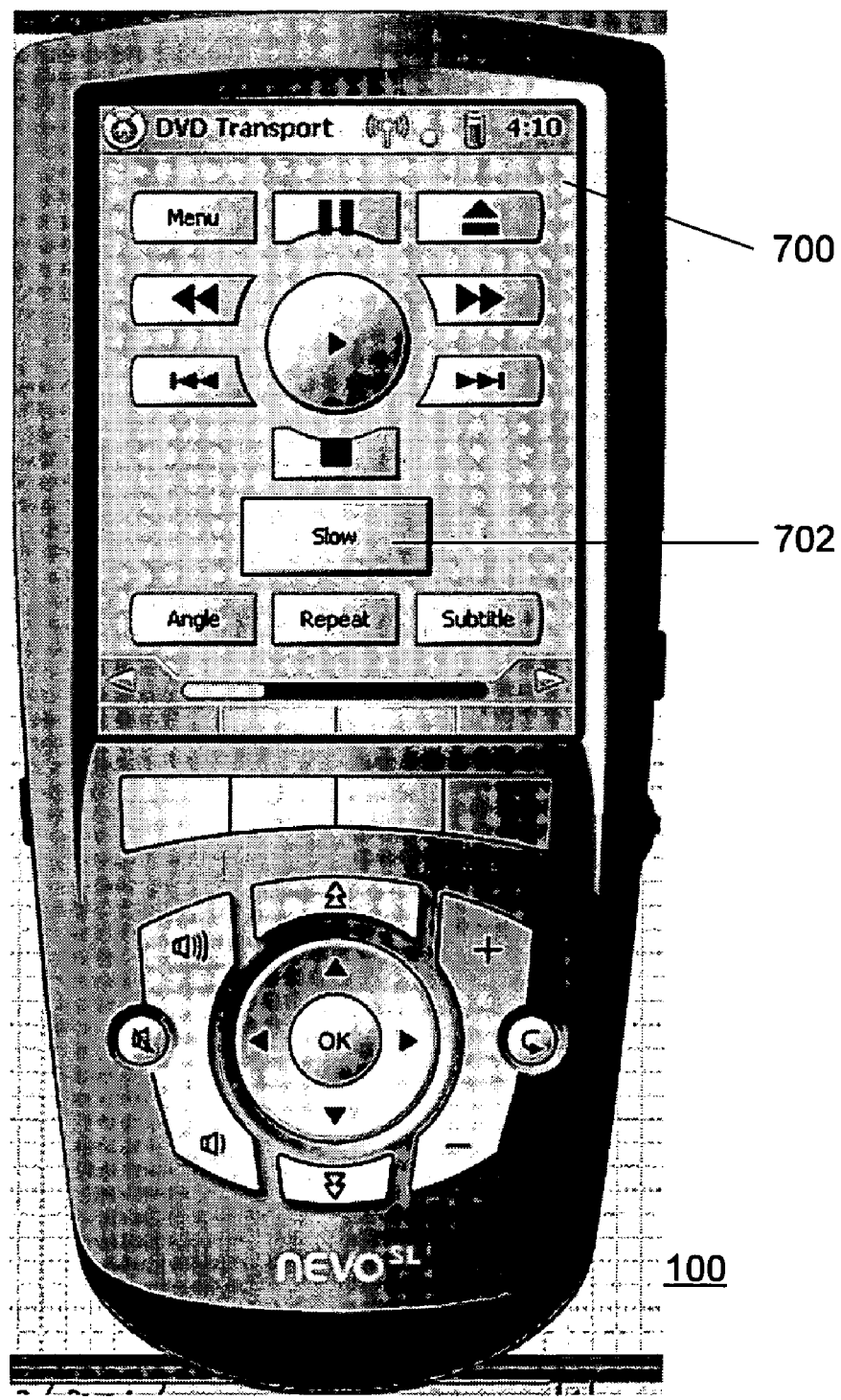
FIG. 7 illustrates another exemplary device control page GUI for the touch screen of a controlling device.
Figure 10:
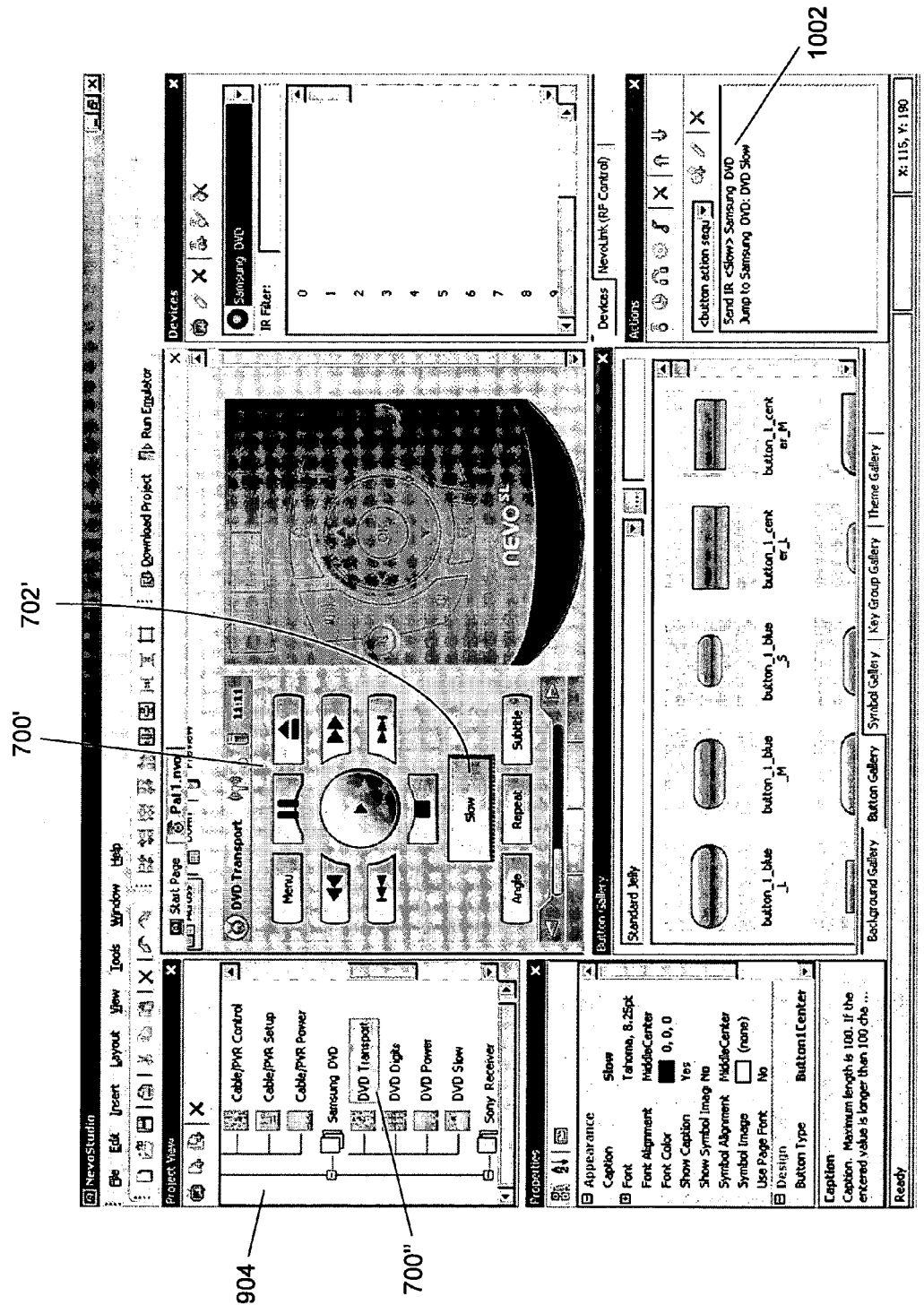
FIG. 10 illustrates an exemplary PC-based editor used to create the appearance and functionality of the GUI of FIG. 7.

Turning now to FIG. 10, wherein GUI page 700 has been loaded for editing by clicking on the appropriate entry icon 700' in the tree listing within Project View panel 904, it is seen that, in response to the selection of the "Slow" icon 702' in the Main panel, the Actions panel display 1002 shows a listing of the actions to be performed by the controlling device 100 when this icon is activated, i.e. transmit a "Slow" command to the DVD player and then jump to the DVD slow motion control page, as previously described in conjunction with FIG. 7.

Figure 8:
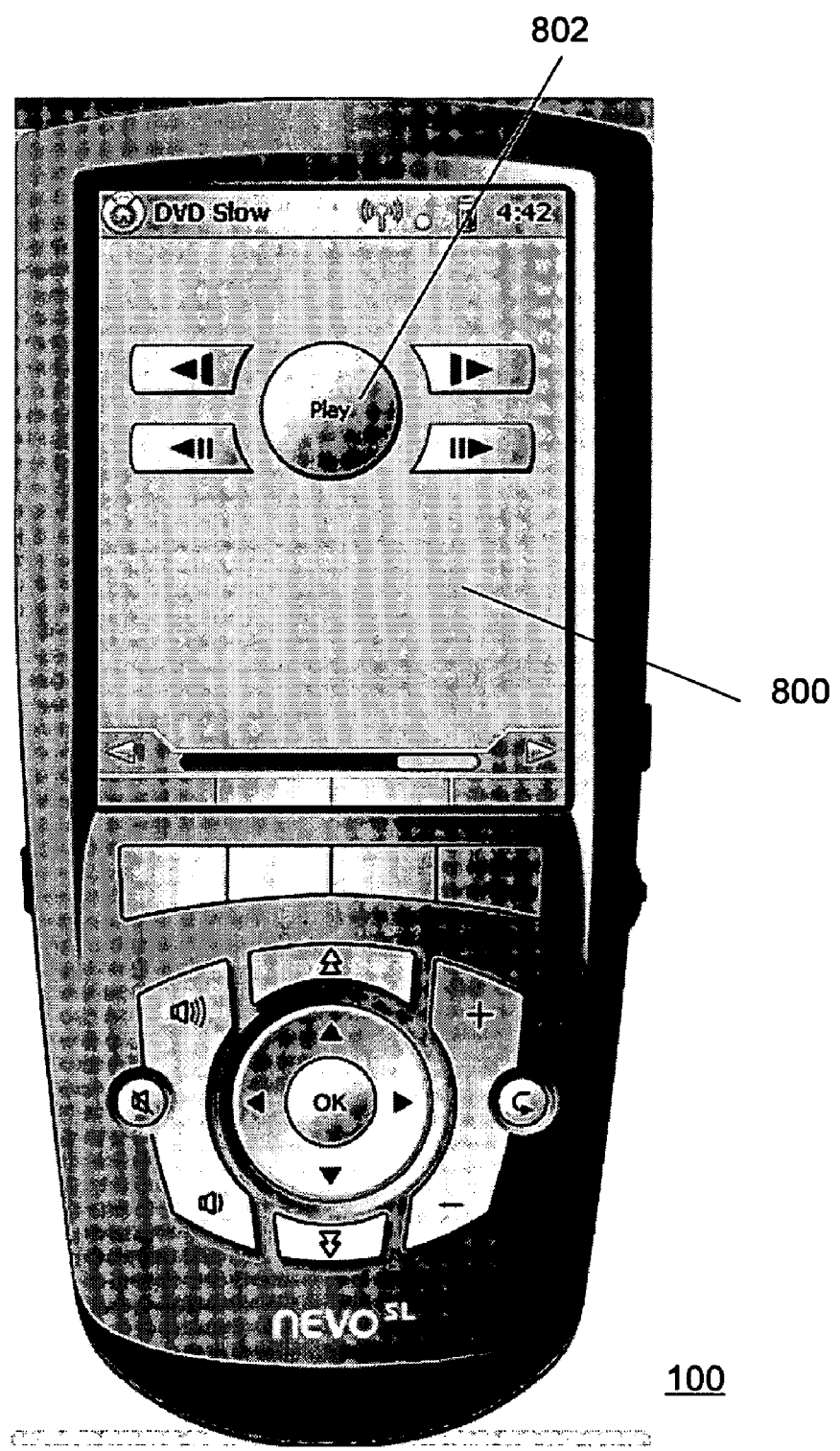
FIG. 8 illustrates yet another exemplary device control page GUI for the touch screen of a controlling device.
Figure 11:
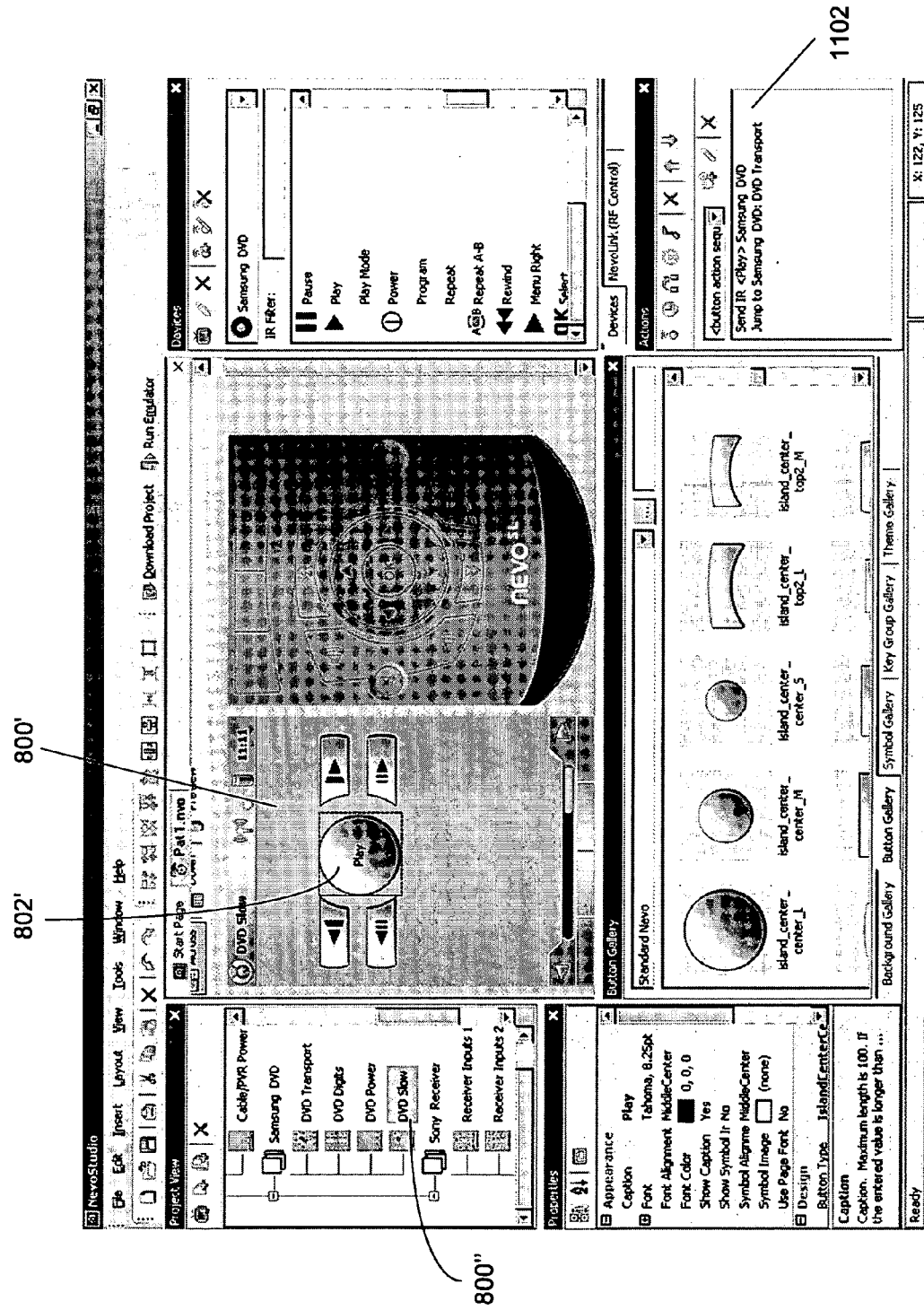
FIG. 11 illustrates an exemplary PC-based editor used to create the appearance and functionality of the GUI of FIG. 8.

Similarly, FIG. 11 illustrates a DVD slow motion control page 800' (instantiated in response to the selection of the "Samsung DVD"/"DVD slow" entry icon 800") and the actions to be performed by the controlling device 100 when the "Play" icon 802' is activated, i.e., transmit a "Resume normal speed play" command to the DVD player and jump to the DVD transport control page 700, as previously described in conjunction with FIG. 8. Again, the listing of functional commands 1102 is instantiated in response to the user selecting the "play" icon 802'.

Figure 5:
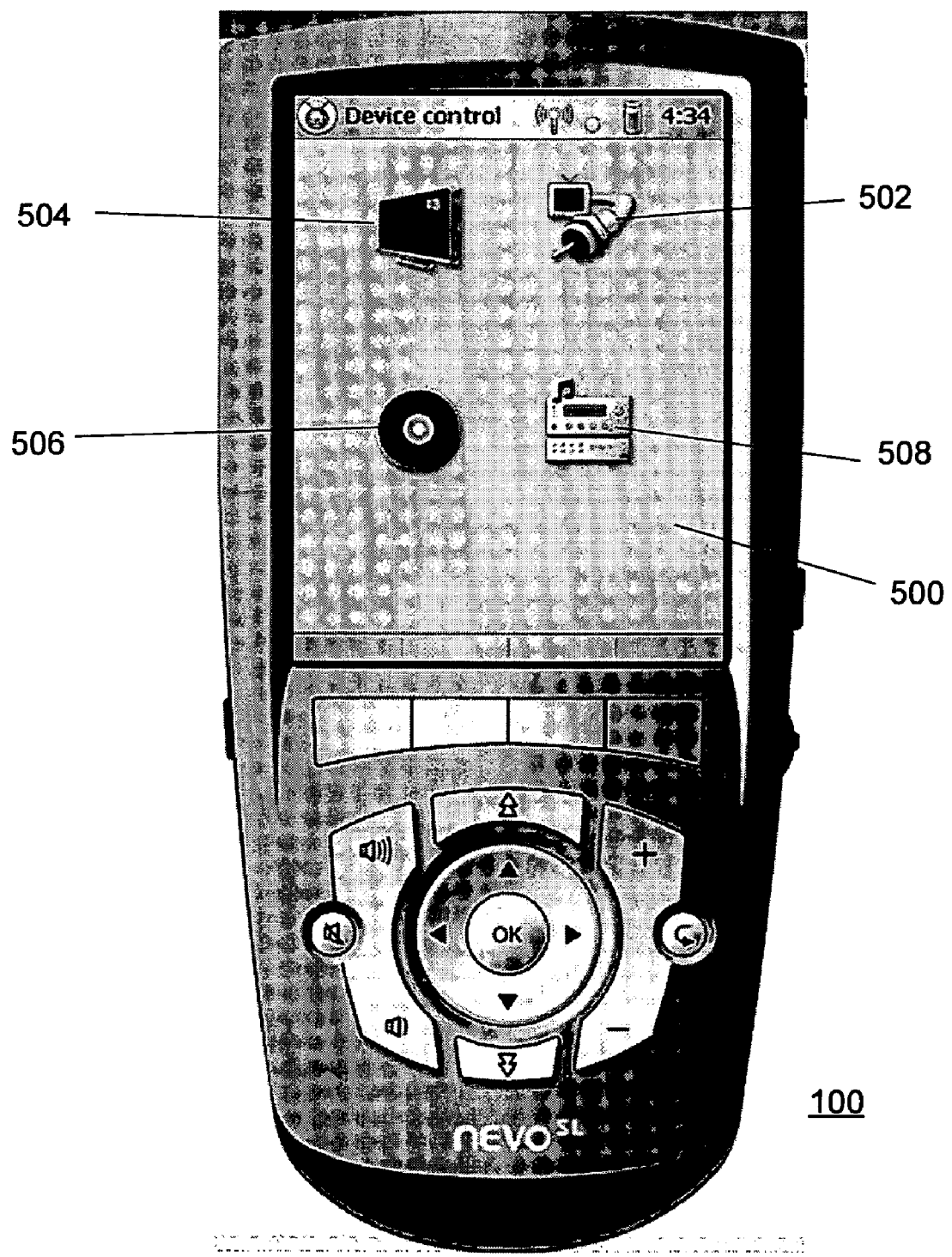
FIG. 5 illustrates an exemplary device selection page GUI for the touch screen of a controlling device.
Figure 6:
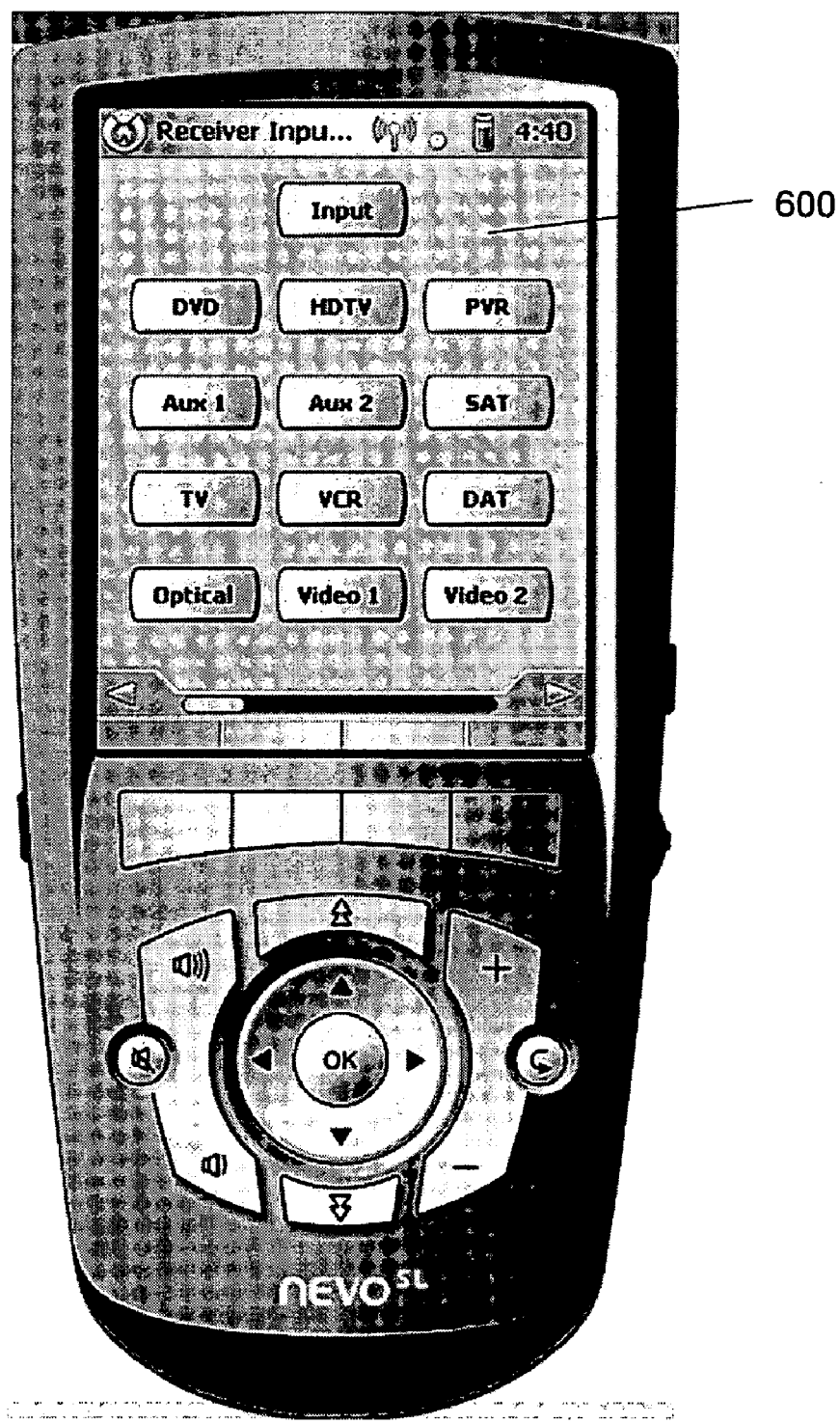
FIG. 6 illustrates an exemplary device control page GUI for the touch screen of a controlling device.
Figure 12:
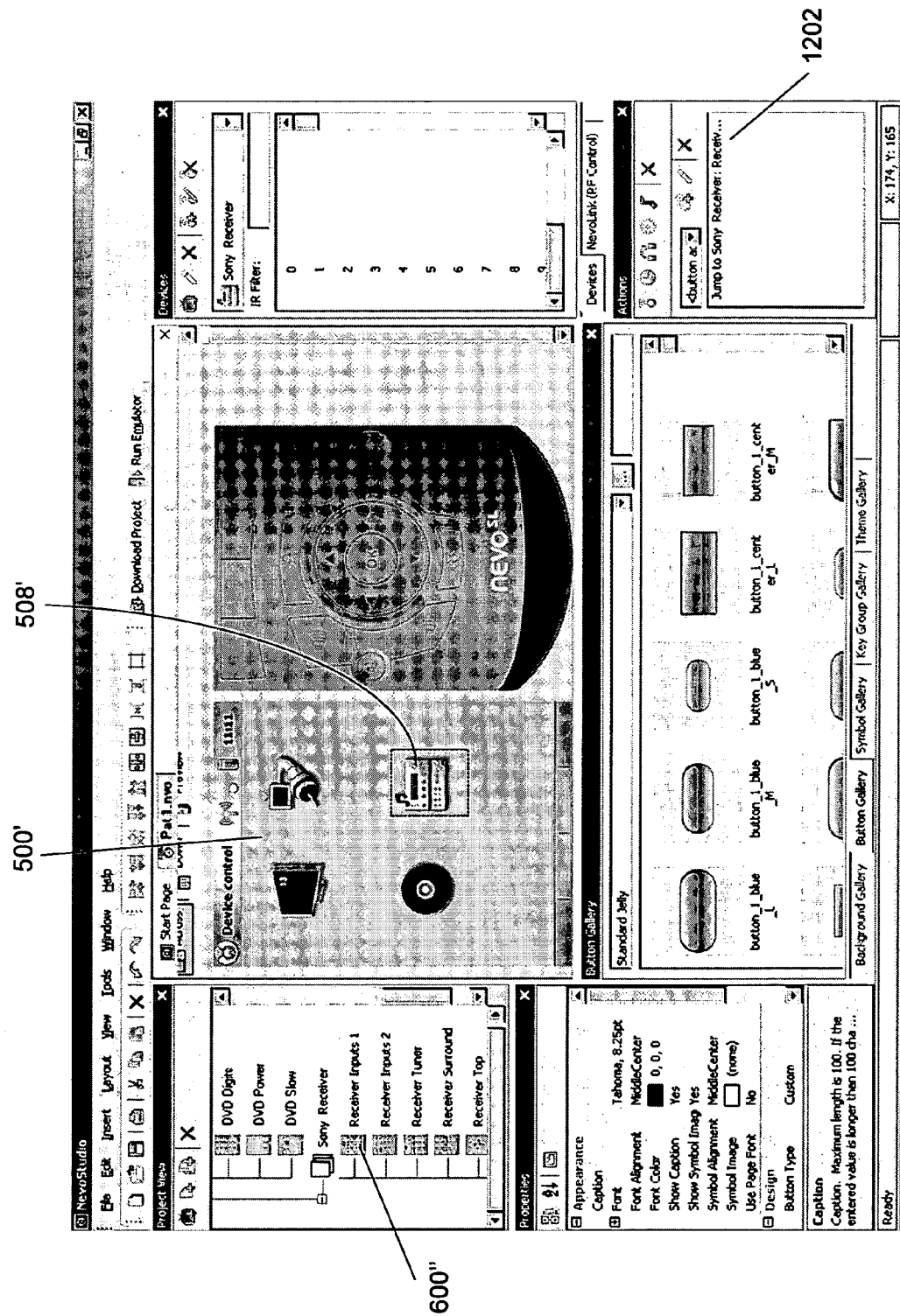
FIG. 12 illustrates an exemplary PC-based editor used to create the appearance and functionality of the GUI of FIG. 5.

FIG. 12 illustrates the editor representation of the devices GUI page of FIG. 5. As discussed, the icons on this page are used to jump directly to the individual device control page sets. As can be seen in Actions panel 1202, the exemplary selected icon 508' is programmed to send no commands, but rather to simply jump directly to the first page of the audio receiver page set 600", corresponding to FIG. 6 in the illustrated examples.

An exemplary set of data structures suitable for storing an editable GUI as a local file 310 on PC 302 will now be discussed. As will be appreciated by those of ordinary skill in the art, many other arrangements and data structures are feasible and accordingly those presented herein are intended to be way of example only, without limitation. Turning to FIG. 23, a top level listing of the exemplary contents of a GUI definition file 310, corresponding to one editing project, is shown in tabular form. Such GUI definition project files may for example be stored on PC 302 as Microsoft Windows cabinet files (similar to the more commonly known zip archive file). As such, file 310 may comprise a container for other files. In the example presented, cabinet file 310 holds a number of XML files and a single resource file which together serve to define a controlling device GUI and its attributes.

Project file 2302 may comprise several sections, for example a ProjectSettings section 2400 (FIG. 24) which may contain system metadata and settings for controlling device 100, for example default backlight timeouts, display brightness, passwords, etc. The ProjectSettings section 2400 may also include a record of the location(s) from which various resources (button widgets, etc.) used in creating the GUI were drawn. Project file 2302 may include further sections such as, for example, a tabulation of global objects such as macros, an index listing of top-level objects, a manifest of all resources available, etc.

Sitemap file 2304, illustrated in FIG. 25, may contain data regarding nodes and edges used to construct a sitemap view of the GUI project (as described in more detail hereinafter).

The Page, Page Collection, Device, Nevo Link, and Media Zone files 2306 through 2314 are all similar. Each comprises an XML description of the corresponding object(s). By way of example, a Page file 2306 will be described in further detail in conjunction with FIG. 26 wherein the root node 2600 of an exemplary typical XML Page file is illustrated. Page file root node 2600 may contain, for example, a page name 2602, data 2604 regarding the background image to be used for the page, information 2606 regarding properties inherited from other pages in the same group, etc. Also contained in exemplary root node 2600 may be a list of child nodes, one for each widget on the page, where a widget may be a button, key guide, etc. By way example, a button node 2610 may contain information regarding button image; label font, size, and placement; actions associated with the button, etc. It will also be noted that node 2610 includes child nodes 2612 and 2614 (MDA and MUA) which correspond to button down action and button up action respectively.

Finally, Resources file 2316 is a standard Microsoft Windows .NET resource file containing all the resources (images) used by the GUI project.

Site mapping.

Figure 13:
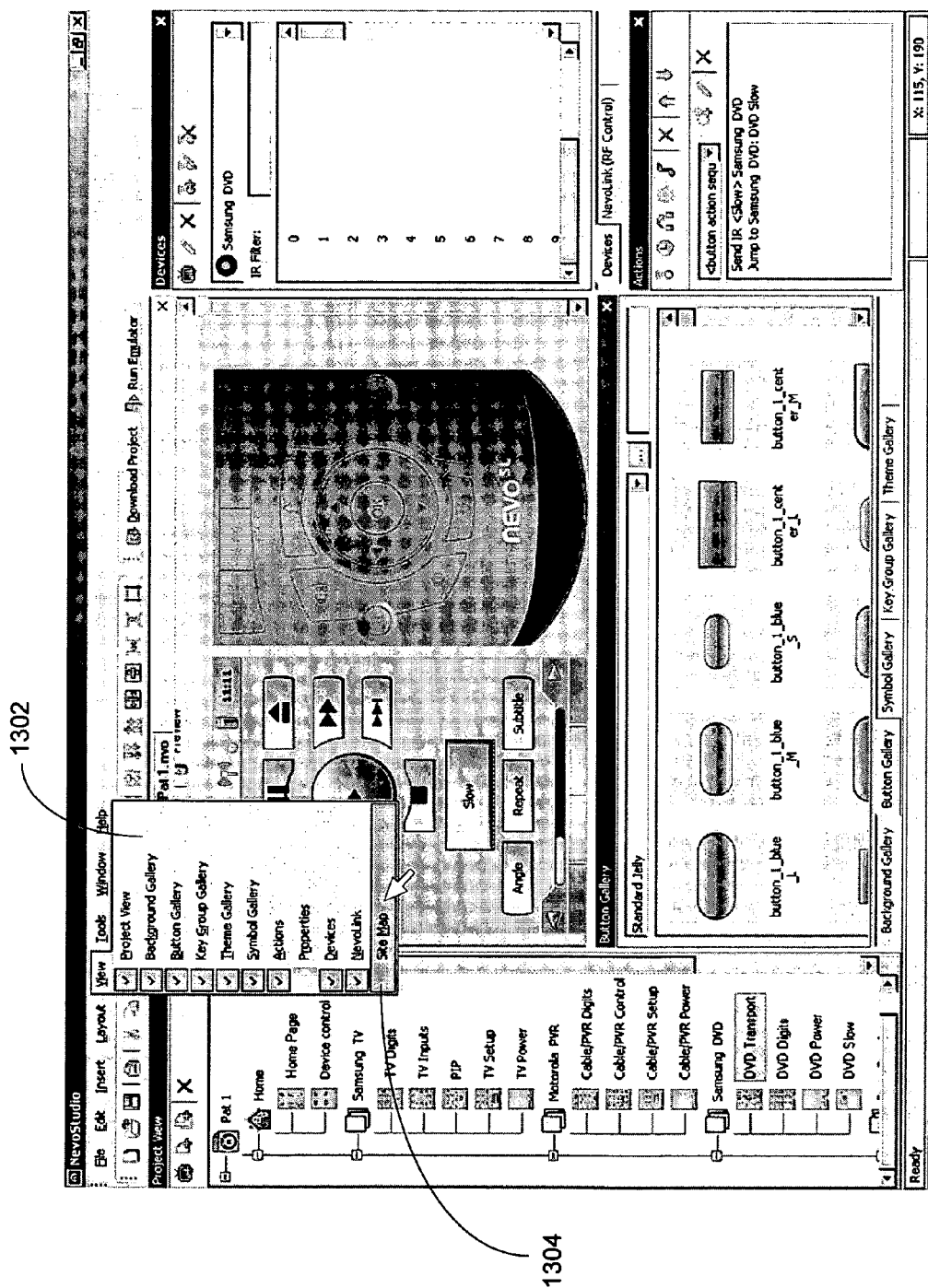
FIGS. 13 and 14 illustrate an exemplary site mapping feature of a PC-based editor used to create GUIs for a controlling device.
Figure 14:
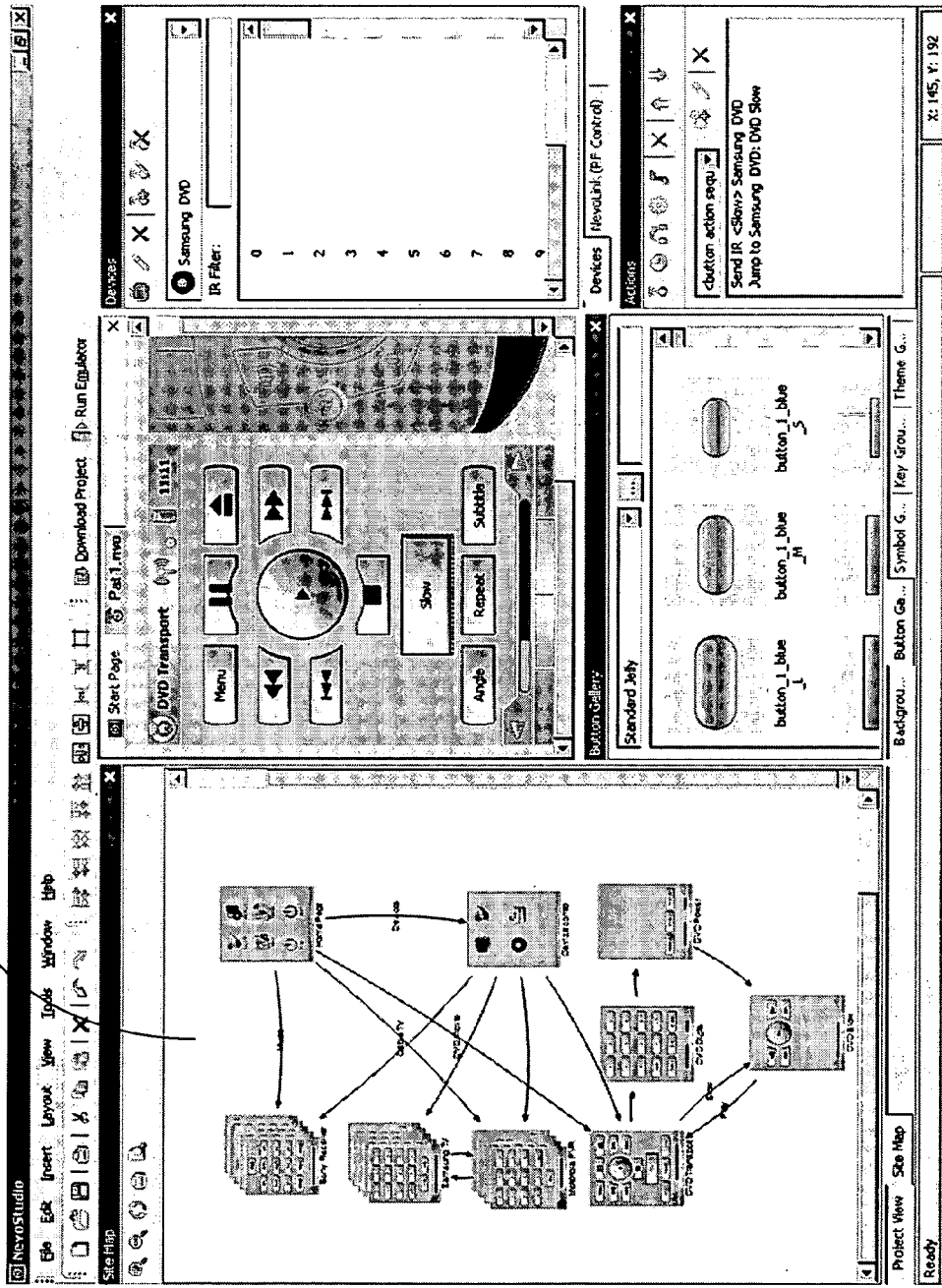
Figure 15:
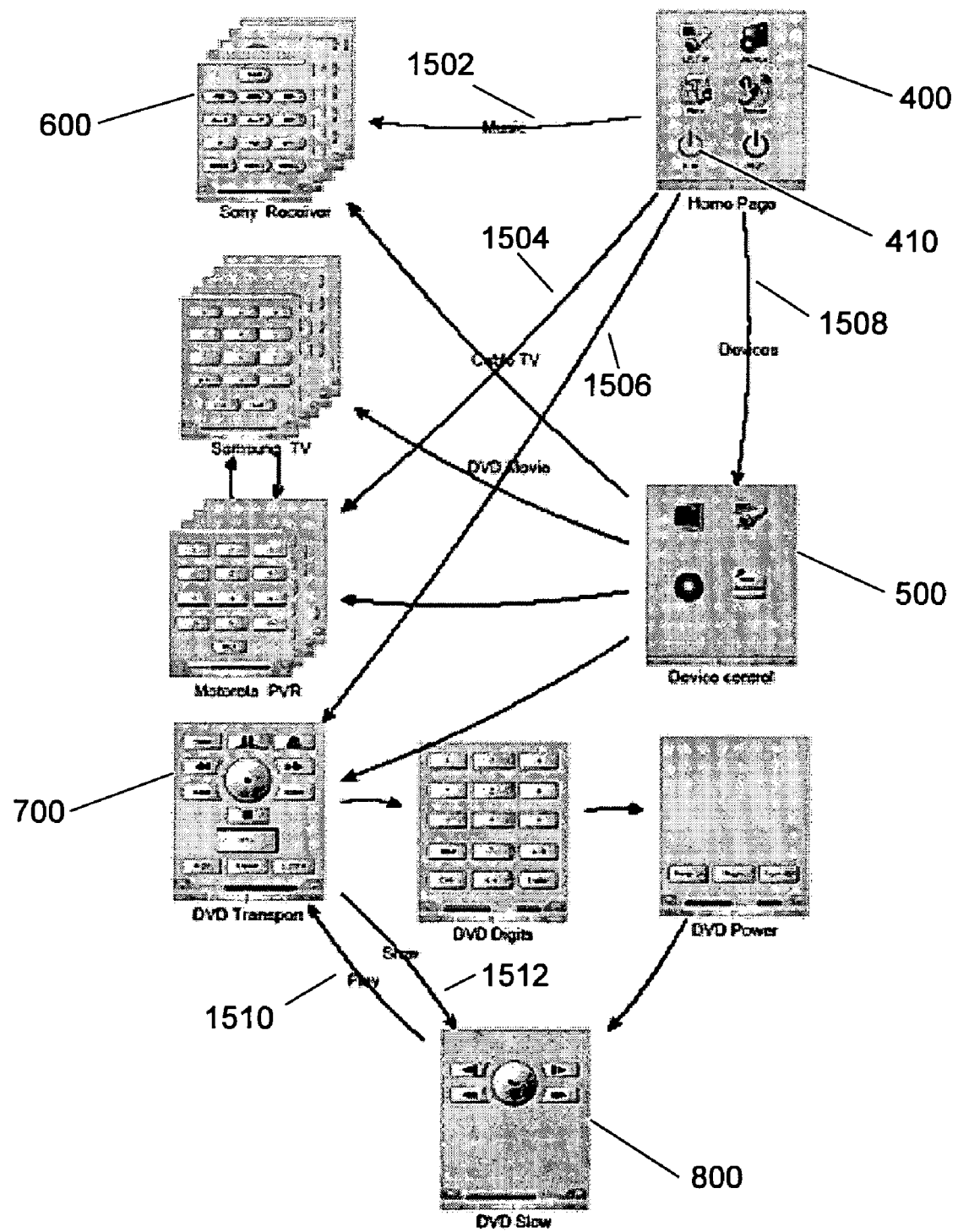
FIG. 15 provides an enlarged view of the site map panel shown in FIG. 14.

While the ability to empower any icon on any controlling device GUI page to transition to another page in the manner described above is powerful feature, it will be appreciated that these linkages between pages may become very complex and difficult to manage, particularly if the only way to visualize them is by flipping back and forth from page to page and examining the actions assigned to each and every key, e.g., by reviewing the page jumping operations that would be shown in the Actions panel. Accordingly, an additional feature is provided within editor 300 to assist the user in managing these assignments. Turning to FIGS. 13 and 14, an additional Site Map panel may be invoked by selecting the appropriately labeled element 1304 in drop down menu 1302. Activating this panel instantiates a visual representation 1402 of the linkages and associations between the various pages of the controlling device GUI currently being edited. The exemplary contents of Site Map panel 1402 are shown enlarged for clarity in FIG. 15. Here it can readily be determined, for example, that Home Page 400 comprises linkages 1502 to the Audio Receiver pages, 1504 to the Cable STB pages, and 1506 to the DVD device pages. It also has a link 1508 to Device Control page 500. Home Page 400 does not, however, link directly to the TV device pages. In this context it will be understood that Site Map view 1402 depicts only transitions from one GUI page to another. Thus, for example, even though the "All On" icon 410 on Home Page 400 may transmit a remote control command to TV 102, it does not cause a GUI page transition and thus does not generate a link to any GUI page in this view. Further examination of FIG. 15 will reveal that the mutual linkages between DVD transport and slow motion pages described earlier are represented at 1510 and 1512, as are the linkages from Device Control page 500 to the various appliance control page sets. It will also be noted that where appropriate, links include the labels or captions of the icons which, when activated on the controlling device 100, cause the illustrated transition. Thus, by way of example, link 1510 is labeled "Play" and link 1512 is labeled "Slow." While the visual representation of the link is a link provided to illustrate the linked connection between the pages, it will be appreciated that other forms of visually representing the linked connection are contemplated.

Additionally, in certain embodiments provision may be made for all or part of such a Site Map representation to be output in hard copy format, either alone or combined with other GUI project data, in the form of maintenance documentation, user manuals, etc.

Key Grouping.

As discussed previously, the basic method of creating a command key using editor 300 is to drag an icon from the Gallery panel 908 onto the control surface being edited within the Main display panel, and then dragging a desired command function from the list displayed in the Device panel 912 onto that icon and/or into the Actions panel, thereby associating activation of that touch screen location with the corresponding page with issuance of the command function. (In the case of hard keys, e.g. 414 through 420, the desired command function is simply dragged onto the appropriate hard key image already displayed in Project panel 902). While allowing great flexibility in GUI design, it will be appreciated that this method may become tedious when large numbers of keys need to be configured.

Figure 16:
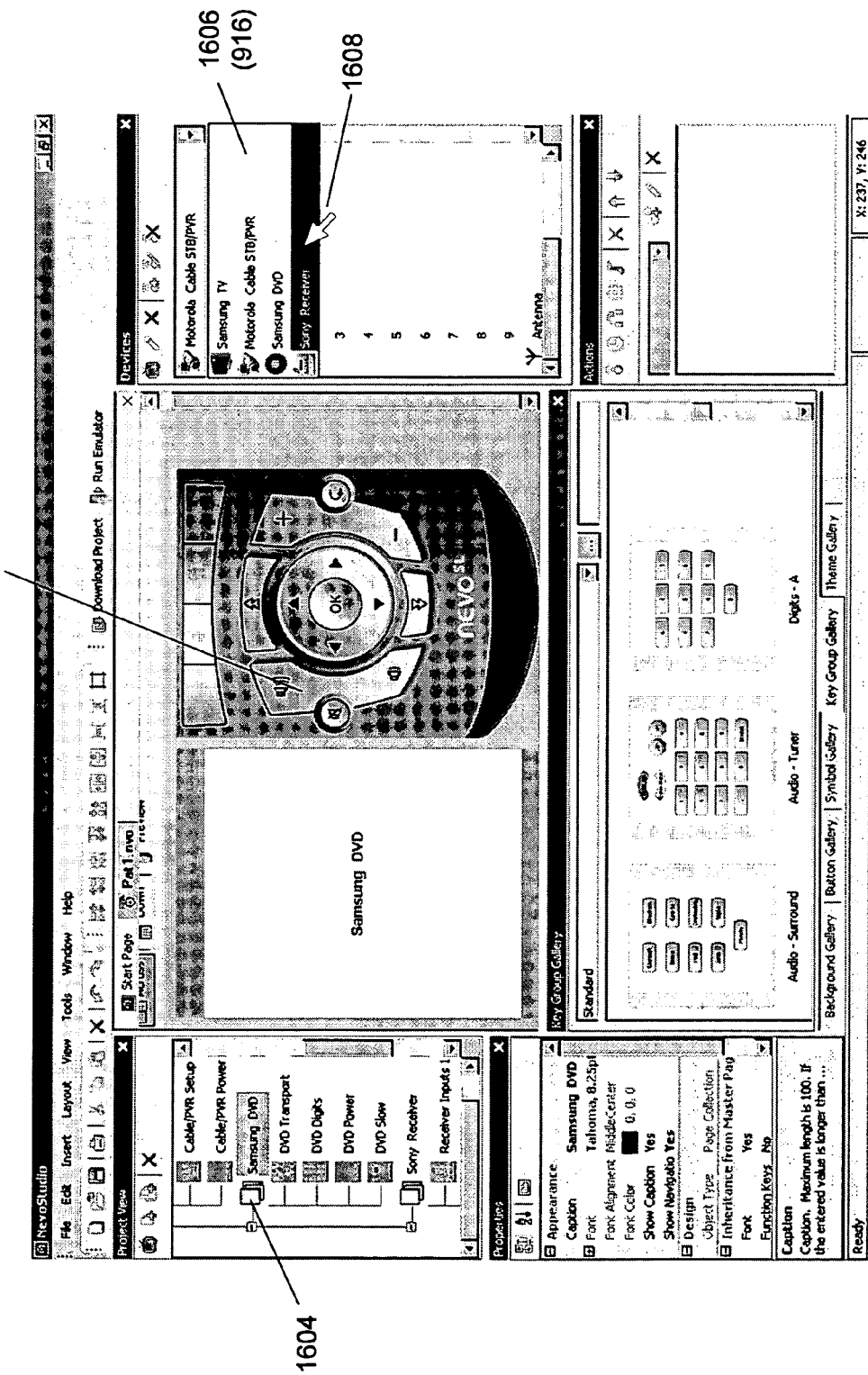
FIGS. 16 and 17 illustrate an exemplary key function mapping method for a PC-based editor used to create GUIs for a controlling device.
Figure 17:
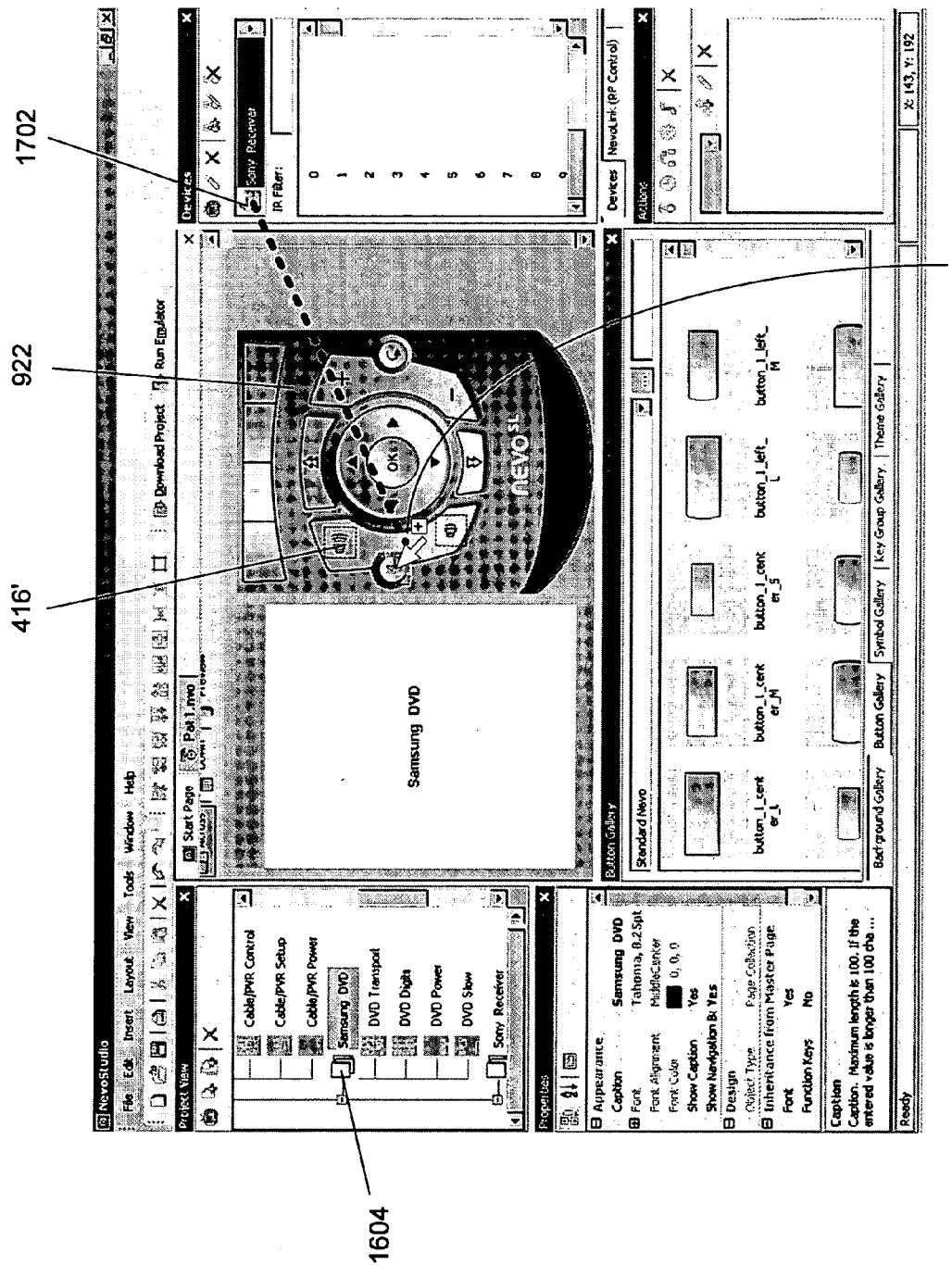

Accordingly, editor 300 additionally supports a key grouping concept. By way of example, with reference to FIGS. 16 and 17, it may be desirable, while watching a DVD movie, to have the controlling device 100 configured such that activations of the volume control buttons 416 of the controlling device 100 transmit volume control command functions to the Audio Receiver 108, since it is likely that the sound will be playing back through that appliance. In the manner described above, these buttons may be configured one by one by first selecting the root 1604 of the DVD device page set in the Project View tree, then selecting the Audio Receiver device 1608 from the Device panel drop down list 1606 (it will be noted that 1606 is the expanded form of 916), and finally dragging the desired functions individually onto buttons 416'. However as an alternative, illustrated in FIG. 17, the device icon 1702 itself may be clicked and dragged across to keys 416'. Since the keys of the group upon which the dragged icon is being positioned are known by appropriate programming within the software program to be related (e.g., volume up, volume down, and mute) the editor 300 may immediately assign the appropriate commands to each of the keys within the group as part of this single, described action. In this context, it will be noted that in the illustrative embodiment hard keys 414 through 420 behave consistently (i.e., command the same operational function) across all pages of a device page set. In certain embodiments, such behavior may be configurable by the user as an option within editor 300 either as a global parameter, individually by device, as a default which may be overridden on particular pages, etc. In the example illustrated, these keys are set for consistent behavior and their configuration may, therefore, be performed only once for each device page set through selection of the root page, 1604 in the example above. A comparison of FIGS. 16 and 10, for example, will reveal that when an individual page within a device page set is selected, e.g. 700" in FIG. 10, hard button display 922 may be thus "grayed out", i.e., shown as not available for assignment, whereas when a root page is selected, e.g., 1604 in FIG. 16, hard button display 922 may be displayed at full intensity, i.e., be shown as available for assignment.

Figure 18:
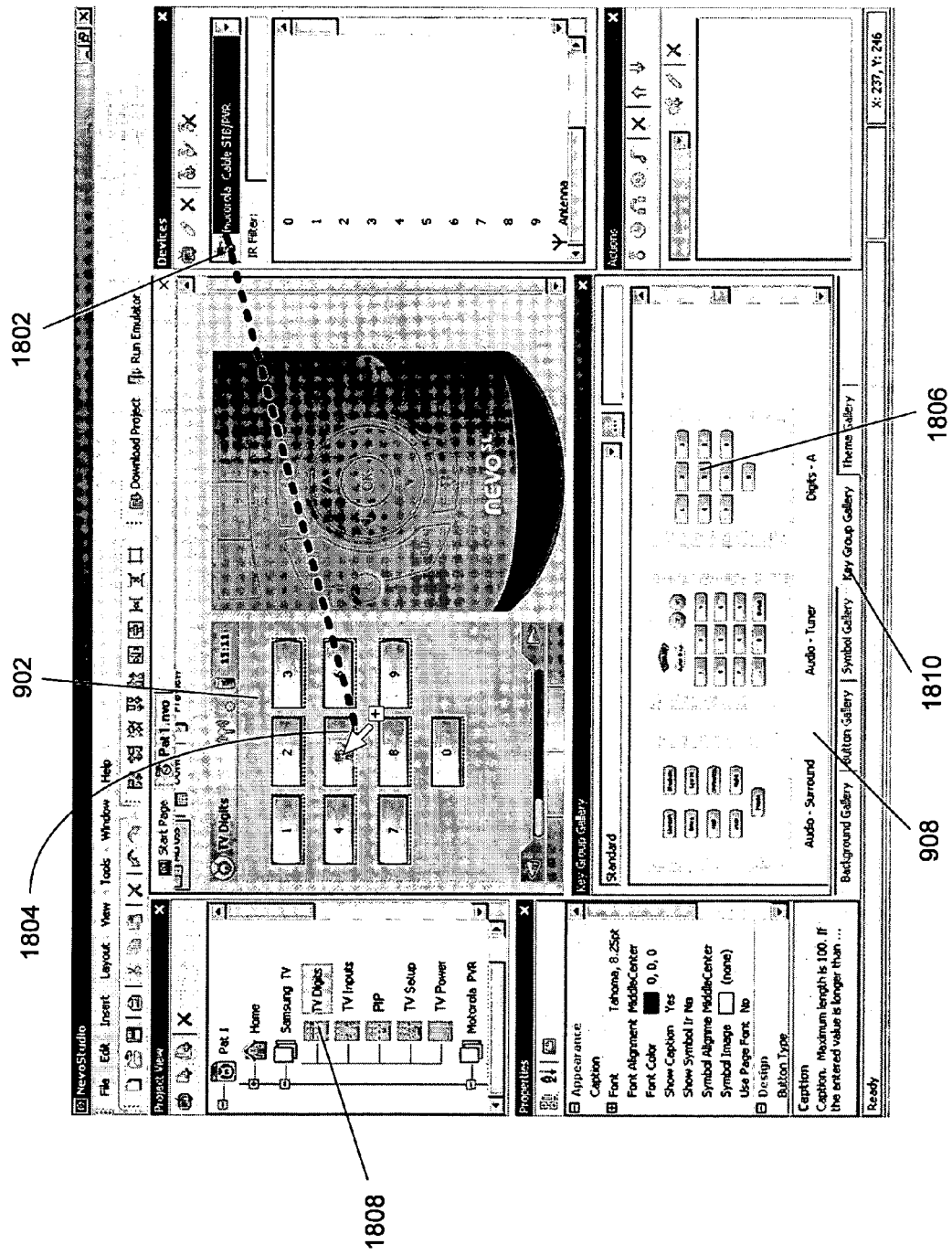
FIG. 18 illustrates a further, exemplary key function mapping method.

By way of further example, FIG. 18 illustrates another use of key grouping. In this example, it has been determined that the controlled equipment configuration is such that all television programming is received via cable, i.e., all channel tuning for the home theater of the consumer is performed by the cable STB 104 and the TVs built-in tuner is, therefore, unused. In this situation it may be desirable to replace the usual TV digit pad commands with the equivalent cable STB functions, such that a user of controlling device 100 does not have to switch to a different appliance page set to change channels when the TV device is active on the controlling device 100. To effect this, the TV digits page 1808 may be selected from the Project View tree and a digit key group defined, either by selecting the Key Group Gallery 1810 for display in Gallery Panel 908 and dragging a digit group 1806 onto the control surface 902 or, in the event a group of keys are already defined in that page by dragging the cursor around the entire group or otherwise indicating a selection of the "TV Digits" page (for example by clicking on the top window bar of the "TV Digits" page itself). Once the key grouping has been selected, each of the keys within the group (e.g., zero through nine) likewise become available for group assignment, as indicated by the highlights (dotted lines) around every key in FIG. 18. The device icon 1802 representing the cable STB may now be clicked and dragged 1804 onto the selected key group in order to effect the desired command function assignment in a single step. While such drag and drop operations are typically performed by dragging and dropping a copy of an icon image, it will be understood that the drag and drop operation could be equally performed by dragging and dropping the icon image itself.

It will be understood and appreciated that while logical key groupings as contemplated herein will generally be groups of associated keys selected by the user for assignment of corresponding commands (e.g. volume key groupings, channel key groupings, input selection key groupings, etc), any key grouping able to be selected or designated by a user via the editor 300 and to which commands may be automatically assigned/mapped by the editor programming will also be understood as a logical key grouping as described and claimed herein. Equally, it will be appreciated that a user may select or define customized collections of keys as logical groups for the purpose of moving or copying functions across pages, etc.

It also will be understood and appreciated by those skilled in the art that appropriate well known programming methodologies such as matching or comparative algorithms, lookup tables, logical groupings, and the like may be implemented in the editor application to enable the various associations between available commands inherent in the device panel and selected function key groupings such that automatic assignment of commands to the appropriate keys is possible with minimal user interaction.

Background Inheritance

Figure 19:
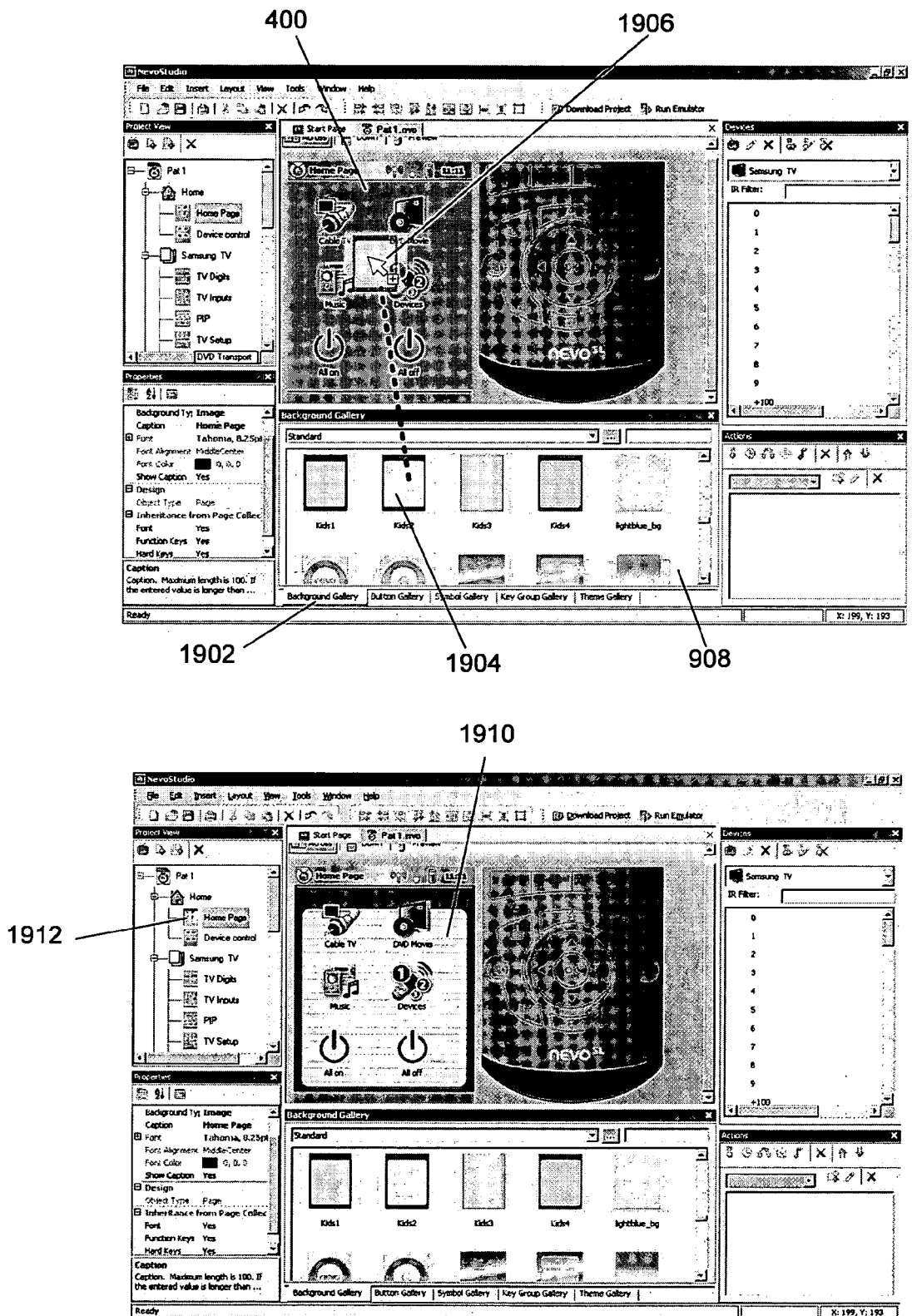
FIG. 19 illustrates an exemplary method for assigning a background graphic to GUI pages(s) of a controlling device.

For use in tailoring the appearance of GUI pages for controlling device 100, editor 300 supports the assignment of a background graphic to each GUI page. The basic method of assigning such a background graphic is illustrated in FIG. 19. The Gallery panel 908 is caused to display the currently available background graphics by selecting tab 1902. The desired background graphic 1904 may then be then dragged onto the desired GUI page 1906. In the illustrated example, the background of Home Page 400 is modified by dragging the "Kids 2" background graphic 1904 onto it, resulting in new Home Page appearance 1910. It will be noted that the page representation 1912 in the Project View tree structure also changes appropriately. As before, while allowing great flexibility in GUI design, it will be appreciated that this method may become tedious when large numbers of items need to be configured.

Figure 20:
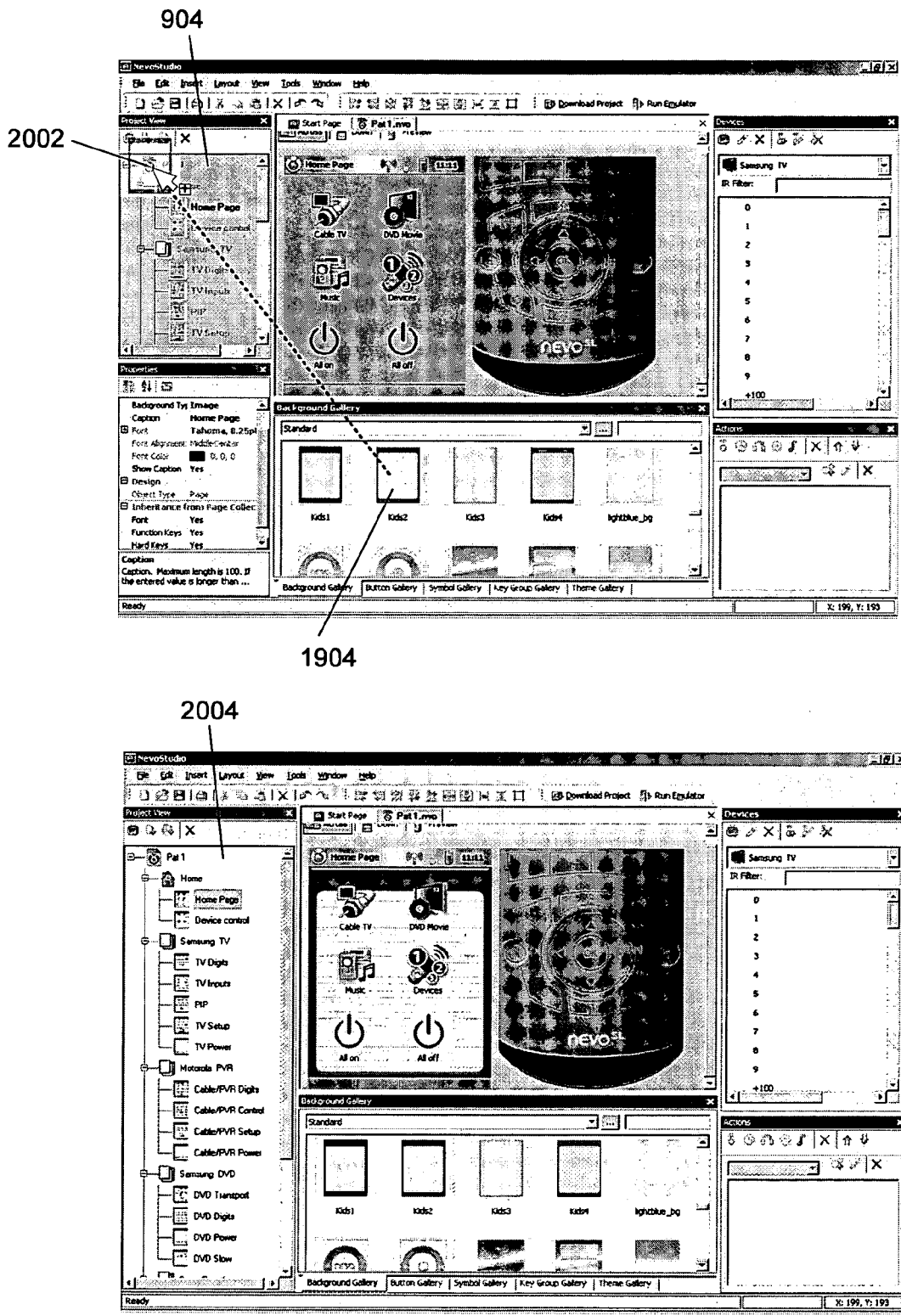
FIGS. 20 and 21 illustrate further, exemplary methods for assigning a background graphic to GUI pages(s) of a controlling device.
Figure 21:
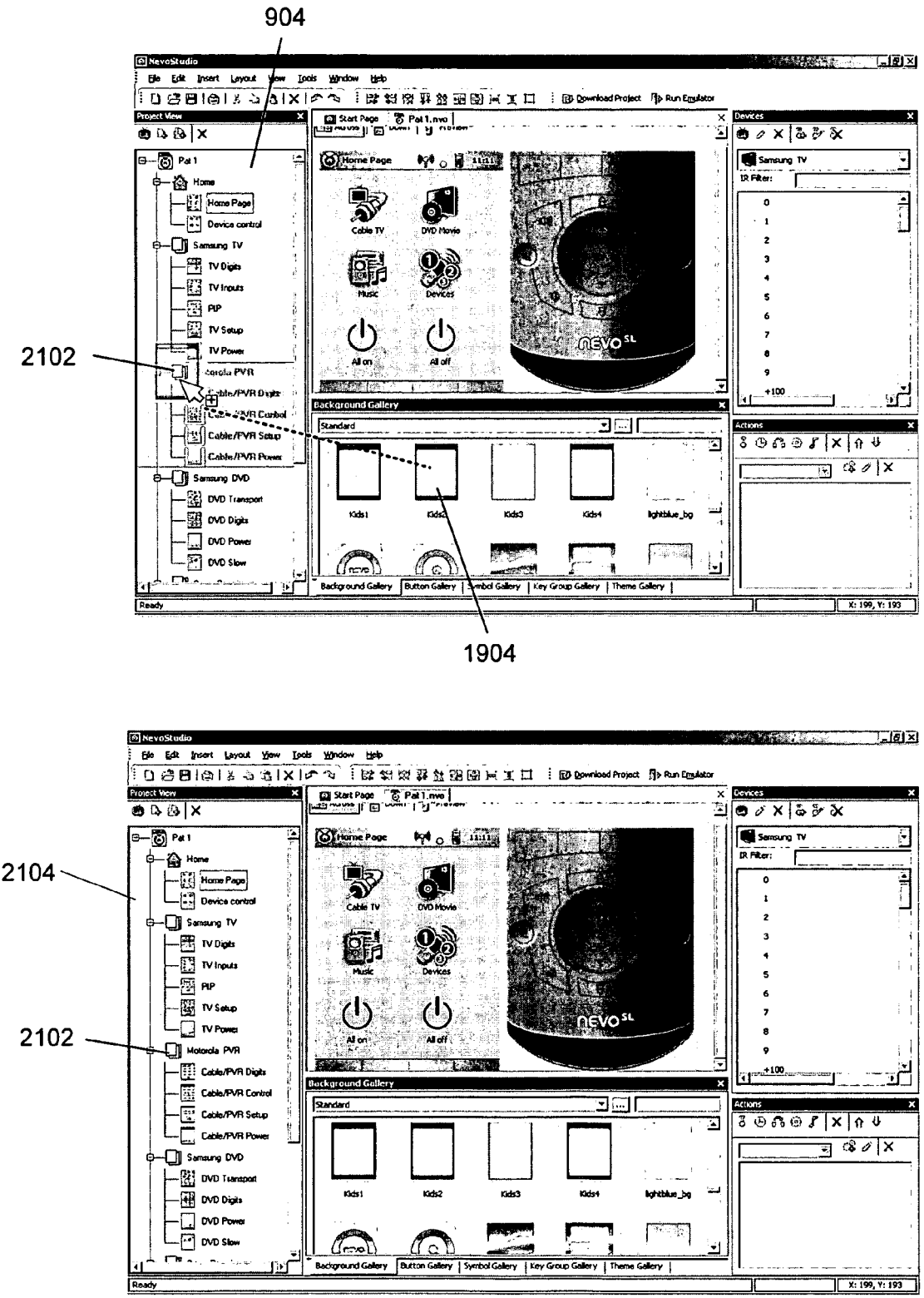

Accordingly, editor 300 additionally supports background inheritance. In this method, a background graphic may be dragged onto any node of the structure presented in the Project View panel 904 to immediately update that node and all nodes lower than it in the hierarchy. By way of example, in FIG. 20 background graphic 1904 is dragged onto Master Page node 2002, thereby changing the background graphic of every GUI page in the controlling device (since these GUI pages are all leafs under the Master Page node 2002 within the tree structure) as can be seen by examination of the resulting Project View panel display 2004. By way of further example, in FIG. 21 background graphic 1904 is dragged onto a root device page 2102 corresponding to the cable sTB device, thereby changing the background graphic of all pages in the page set related to the cable sTB device (i.e., those leaf pages under the root device page 2102 within the tree structure) as is apparent by examination of updated Project View panel display 2104.

Pre-Processing Prior to Downloading GUI to Controlling Device.

Figure 22:
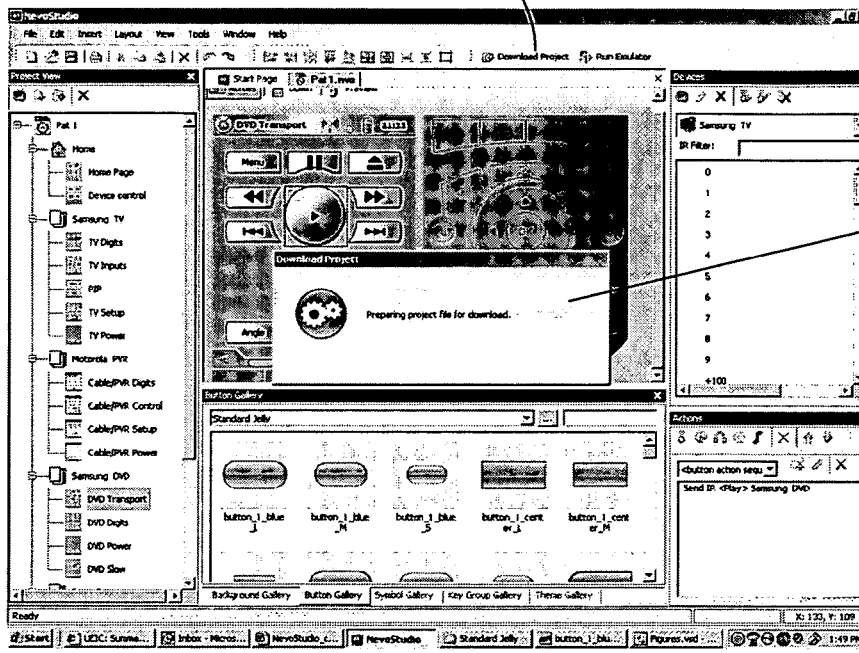
FIG. 22 illustrates an exemplary method of downloading project files created using the PC-based editor to the controlling device.
Figure 22:
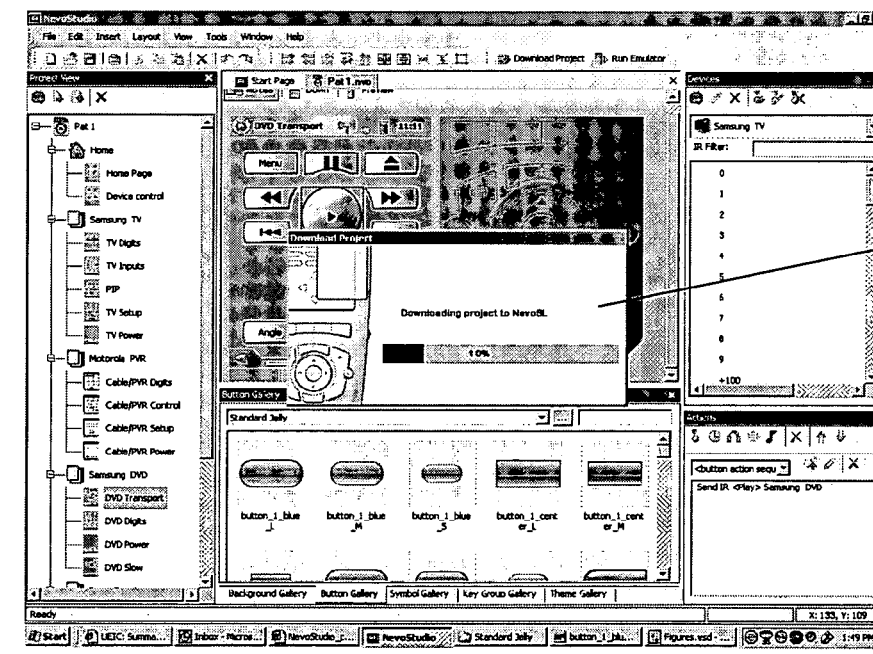

When the user of exemplary editor program 300 initiates the download of a newly-edited GUI to controlling device 100 by clicking tab 2202 illustrated in FIG. 22, it may be desirable to have editor program 300 first pre-process the PC-resident descriptive data (as exemplified by file 310) into a form which may be more efficiently used within controlling device 100. This may be accomplished by way of a pause 2204 during which pre-processing is performed before commencing the download process 2206.

For example, the contents of file 310 may be parsed to remove elements which are necessary only for features offered to support the PC editing process. In the exemplary embodiment presented above for instance, the sitemap XML file may eliminated from the download, since this supports editor-only feature 1402. Further, individual resource files may be generated for each page instead of a single Windows format Resources file in order to improve efficiency of operation with controlling device 100. In instances where the color palette of controlling device 100 is less extensive that of PC 302, image quality may be reduced (thereby reducing the amount of memory storage required) with no discernable degradation. By way of example, a reduction to 25% of original quality may be possible when the controlling device only supports 16-bit color.

Additional graphic pre-rendering may be performed where appropriate. For example, as will be appreciated by those of skill in the art, activatable gallery buttons and icons for use in creating GUI pages generally comprise two separate graphics: one representing the icon or button's normal or "up" state, and the other representing the icon or button's activated or "down" state. Whenever controlling device 100 detects a user touch to an activatable area of the LCD screen, the corresponding button/icon graphic is changed from the "up" to the "down" form as an acknowledgement and confirmation of input. The quiescent, or unactivated GUI state of each page may thus be viewed as a composite of many graphic elements: That is, comprising a background graphic upon which is overlayed a number of individual button/icon "up" state graphics. During the editing process, these must all be maintained as separate graphic elements, since buttons may be moved, added, deleted, resized, etc. at any time. However, once loaded into controlling device 100, the quiescent state graphic of each page of the GUI may be regarded as fixed since button/icon locations are no longer alterable. The only variable aspect is the "down" state of each button.

Accordingly, immediately prior to downloading to the controlling device 100, the PC-based editor 300 may pre-render the "up" state of the buttons/icons and background for each page into a single graphic element, including any associated graphical effects such as blending, anti-aliasing, fades, blurs, glows, shadows, etc as may be included for additional visual effect on the controlling device interface. This method conserves memory and processing power and improves page-to-page display transition time on the relatively resource limited controlling device 100. Additionally, it allows use of the more powerful PC system to perform tasks such as reducing large graphics files to the correct size for the controlling device LCD display and processing graphic effects such as blending, anti-aliasing, fades, blurs, glows, shadows, etc.

While various concepts have been described in detail, it will be appreciated by those skilled in the art that various modifications and alternatives to those concepts could be developed in light of the overall teachings of the disclosure. For example, while the embodiments presented above are described in the context of universal remote controls (i.e., controlling devices capable of commanding the operation of multiple classes of appliances devices from multiple manufacturers) as being most broadly representative of controlling devices in general, it will be appreciated that the teachings of this disclosure may be equally well applied to other controlling devices of narrower capability, and also to any general or specific purpose device requiring a visual interface (i.e., display screens, signage devices, teleprompters, etc.) without departing from the spirit and scope of the present invention. still further, it will be appreciated that the user interfaces described herein need not be limited to controlling devices but can be utilized in connection with any device having input elements wherein it is desired to convey information concerning such input elements. For example, the user interface may be utilized with devices such as calculators, phones, appliances, etc. having input elements having associated information conveying images in the form of alphanumeric and/or symbolic labels. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A computer-readable media having instructions executable on a computing device for editing a controlling device user interface downloadable to a controlling device and comprised of a plurality of individual GUI pages including a first GUI page and a second GUI page, the instructions performing steps comprising:

accepting input to edit the controlling device user interface, the input being used to create a link between the first GUI page and the second GUI page where the link is executable on the controlling device via actuation of a GUI element of the first GUI page to cause the controlling device to transition from the first GUI page to the second GUI page;

accepting input to cause a simultaneous display of an image representative of the first GUI page, an image representative of the second GUI page, and an image representative of the link between the first GUI page and the second GUI page wherein the image representative of the link has an associated label which indicates the GUI element to be actuated to cause the controlling device to transition from the first GUI page to the second GUI page; and accepting input to initiate a download of the edited controlling device user interface to the controlling device.

2. The computer-readable media as recited in claim 1, wherein accepting input to edit the controlling device user interface includes accepting input used to assign a command to be transmitted from the controlling device to an appliance in response to actuation of the GUI element of the first GUI page.

3. The computer-readable media as recited in claim 1, wherein the edited controlling device user interface is downloadable to the controlling device via a network connection.

4. The computer-readable media as recited in claim 1, wherein the edited controlling device user interface is downloadable to the controlling device via a docking station.

5. The computer-readable media as recited in claim 1, wherein the edited controlling device user interface is downloadable to the controlling device directly from the computing device.

6. The computer-readable media as recited in claim 1, wherein the image representative of the first GUI page and the image representative of the second GUI page comprise a thumbnail image of the first GUI page and a thumbnail image of the second GUI page, respectively.

7. A method for interacting with a computing device to edit a controlling device user interface downloadable to a controlling device and comprised of a plurality of individual GUI pages including a first GUI page and a second GUI page, the method comprising:

editing the controlling device user interface on the computing device by providing input that is used by the computing device to create a link between the first GUI page and the second GUI page where the link is executable on the controlling device via actuation of a GUI element of the first GUI page to cause the controlling device to transition from the first GUI page to the second GUI page;

causing the computing device to simultaneously display an image representative of the first GUI page, an image representative of the second GUI page, and an image representative of the link between the first GUI page and the second GUI page wherein the image representative of the link has an associated label which indicates the GUI element to be actuated to cause the controlling device to transition from the first GUI page to the second GUI page; and causing a download of the edited controlling device user interface to the controlling device.

8. The method as recited in claim 7, comprising editing the controlling device user interface on the computing device by providing input that is used by the computing device to create an association between the GUI element of the first GUI page and a command to be transmitted from the controlling device to an appliance in response to actuation of the GUI element of the first GUI page.

9. The method as recited in claim 7, wherein the image representative of the first GUI page and the image representative of the second GUI page comprise a thumbnail image of the first GUI page and a thumbnail image of the second GUI page, respectively.

* * * * *